US008364977B2

(12) United States Patent
Lablans

(10) Patent No.: US 8,364,977 B2
(45) Date of Patent: Jan. 29, 2013

(54) METHODS AND SYSTEMS FOR PROCESSING OF N-STATE SYMBOLS WITH XOR AND EQUALITY BINARY FUNCTIONS

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 834 days.

(21) Appl. No.: 12/137,945

(22) Filed: Jun. 12, 2008

(65) Prior Publication Data
US 2008/0244274 A1 Oct. 2, 2008

Related U.S. Application Data

(63) Continuation-in-part of application No. 10/935,960, filed on Sep. 8, 2004, now Pat. No. 7,643,632.

(60) Provisional application No. 60/547,683, filed on Feb. 25, 2004, provisional application No. 60/943,682, filed on Jun. 13, 2007.

(51) Int. Cl.
*G06F 11/30* (2006.01)
*G06F 12/14* (2006.01)

(52) U.S. Cl. .................................... 713/189
(58) Field of Classification Search .................. 713/189
See application file for complete search history.

(56) References Cited

U.S. PATENT DOCUMENTS

| 5,412,665 | A | 5/1995 | Gruodis | |
|---|---|---|---|---|
| 5,745,522 | A * | 4/1998 | Heegard | ........................ 380/46 |
| 6,188,714 | B1 | 2/2001 | Yamaguchi | |
| 6,430,246 | B1 | 8/2002 | Ozluturk | |
| 6,463,448 | B1 | 10/2002 | Mo | |
| 6,510,228 | B2 | 1/2003 | Rose | |
| 6,665,692 | B1 * | 12/2003 | Nieminen | ...................... 708/250 |
| 6,769,084 | B2 * | 7/2004 | Kim et al. | ...................... 714/739 |
| 6,785,389 | B1 | 8/2004 | Sella et al. | |
| 7,046,803 | B2 | 5/2006 | Lee et al. | |
| 7,082,449 | B2 | 7/2006 | Rarick | |
| 7,227,949 | B2 | 6/2007 | Heegard et al. | |

OTHER PUBLICATIONS

Roth, Charles H. Jr, "Fundamentals of Logic Design," Fourth Edition, pp. 27-29 and pp. 88-89. Copyright 1995.*
Benjamin, Arazi, "Self Synchronizing Digital Scramblers," Dec. 1977, IEEE Transactions on Communications, vol. com-25, No. 12, pp. 1505-1507.*
Rogers, Derek P., "Non-Binary Spread-Spectrum Multiple-Access Communications", *Thesis for the degree of Doctor of Philosophy*, The University of Adelaide, Faculty of Engineering, Department of Electrical and Electronic Engineering, Adelaide, Australia, Mar. 1995., 213 pages.
Clarke, C.K.P. "Reed-Solomon Error Correction", *BBC R&D White Paper*, (Jul. 2002), 45 pp.

* cited by examiner

*Primary Examiner* — William Powers
*Assistant Examiner* — Dant Shaifer Harriman
(74) *Attorney, Agent, or Firm* — Diehl Servilla LLC

(57) ABSTRACT

Multi-valued or n-state with $n=2^p$ Linear Feedback Shift Registers (LFSRs) in binary form are provided for scramblers, descramblers and sequence generators using addition and multiplication functions over a Finite Field GF(n) in binary form. N-state switching functions in an LFSR are implemented by using implementations of reversible binary functions. LFSRs may be in Fibonacci or in Galois configuration. N-state LFSR based sequence generators in binary form for generating an n-state maximum length sequence in binary form are also provided. A method for simple correlation calculation is provided. Communication systems and data storage systems using the LFSRs are also disclosed.

19 Claims, 23 Drawing Sheets

METHODS AND SYSTEMS FOR PROCESSING OF N-STATE SYMBOLS WITH XOR AND EQUALITY BINARY FUNCTIONS

STATEMENT OF RELATED CASES

This application is a continuation-in-part of U.S. patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS, which claims priority to U.S. Provisional Patent Application No. 60/547,683, filed Feb. 25, 2004, and of U.S. patent application Ser. No. 11/042,645 filed on Jan. 25, 2005 which are all incorporated herein by reference in their entirety. Furthermore, this application claims the benefit of U.S. Provisional Patent Application No. 60/943,682 filed on Jun. 13, 2007 which is incorporated herein by reference.

BACKGROUND OF THE INVENTION

This invention relates to the processing of multi-valued or n-state (non-binary) signals with n>2. More in particular it relates to the scrambling, descrambling, generation and the detection of multi-valued (non-binary) or n-state signals representing sequences of multi-valued (non-binary) or n-state symbols such as n-valued pseudo-noise sequences. Multi-valued signals also referred to as n-valued or n-state signals, can assume one of n states, wherein n is greater than or equal to three.

The n-state scramblers and descramblers are implemented by using a Linear Feedback Shift Register or LFSR. Well known is the binary LFSR based scrambler and the corresponding self synchronizing LFSR based binary descrambler.

Its potential application is in telecommunication systems, control systems and other applications. Specific examples of utility where the invention can be used include spread-spectrum technologies, signal scrambling, CDMA, QAM-$2^k$ modulation, multi-state symbol modulation, line-coding and scrambling application in video and other signal modulation and distribution.

LFSR based scramblers are used to change the appearance of a digital signal in such a way that during transmission the signal is different from the original signal. The original signal can be recovered from the scrambled signal at the receiving end by a descrambler. LFSR scramblers are one-to-one coders, coding one symbol on an input to one symbol on an output. LFSR scramblers are commonly used as streaming coders, which are different from word or block coders. Most commonly in today's telecommunications, the scramblers relate to binary signals.

Scrambling of a binary signal can be achieved by combining the binary signal to be scrambled with a second known binary signal through a digital circuit that has the characteristics of a reversible function. A known signal is commonly known as a key and may for instance be derived from a prime number, which may be a large prime number.

In the case of scrambling with an LFSR scrambler there is no real known signal. A second signal that is used for scrambling comes from the LFSR. Such a signal is essentially unknown. However, the nature of the LFSR allows the signal from the LFSR to be reconstructed at the receiving side. Though the signal from the LFSR is still unknown, it can be reconstructed and thus can be applied to recover the original signal from a scrambled signal.

The inventor has provided the rule for an n-valued or n-state LFSR based descrambler corresponding to an n-valued LFSR based scrambler. This has been disclosed in U.S. patent application Ser. No. 10/935,960 filed Sep. 8, 2004 entitled Ternary and multi-valued digital signal scramblers, descramblers and sequence generators and in U.S. patent application Ser. No. 10/912,954 filed Aug. 6, 2004 entitled Ternary and higher multi-valued digital scramblers/descramblers, which are both incorporated herein by reference in their entirety.

There are two known binary functions that can perform this reversible function: the Exclusive Or (XOR) and the Equal or EQUALITY function (=) in a binary scrambler and descrambler. However the XOR function is commonly used exclusively in scramblers and coders. The XOR function is also known as the modulo-2 adding function.

Telecommunication markets such as wireless communications and Internet communications demonstrate an ongoing increase in demand for higher information transmission rates. This demand in increased information transmission rates in wireless communications is addressed by increasing bandwidth of communication channels, by compression of the information and by moving into much higher radio spectra (such as Ultra Wide Band in the 5 GHz area). Eventually, new technology has to be applied to obtain better performance from existing bandwidth, starting with highly congested spectrum areas. Current transmission technology predominantly uses digital binary signals. One technology that provides better bandwidth usage is the application of multi-valued or n-state signals on a much broader scale. Scrambling, descrambling and signal sequence generation is an important element of signal processing technology, especially in wireless communications. Currently, very little technology exists that can perform multi-valued digital scrambling, descrambling and sequence generation. Most of existing solutions in scrambling, descrambling and sequence generation only performs binary functions, as previously discussed.

It is possible to generate non-binary signals with binary switching means, by temporarily transferring non-binary signals or symbols into words or a plurality of binary symbols. This allows the binary signals to be processed by involving fairly standard binary circuitry in novel configurations. After processing the binary signals or symbols one may then transform the binary words or plurality of binary symbols into non-binary symbols. However, there is currently no easy method available to perform n-valued scrambling, descrambling, sequence generation and sequence detection with n-valued technologies that are easy to perform with binary means.

Accordingly, new and improved methods and apparatus for LFSRs to perform n-state scrambling, descrambling, sequence generation and sequence detection on multi-valued or n-state signals with binary technologies are required.

SUMMARY OF THE INVENTION

In view of the more limited possibilities of the prior art in binary and multi-valued scrambling and reversible logic functions, the current invention offers an easier design as well as a greater variety in multi-valued scramblers and in LFSR based sequence generators. It also provides improved performance.

The general purpose of the present invention, which will be described subsequently in greater detail, is to provide new scrambler/descrambler systems and LFSR based generators of multi-valued signal sequences.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Multi-valued, n-valued and n-state in the context of this application mean a number n, with n being a positive integer greater than two. As a matter of habit, one currently may use the name multi-valued logic or multiple-valued logic for the technology of non-binary logic. In binary logic technology one applies signals which may assume one of two states. These states are usually represented as 0 and 1. Furthermore, in binary logic one logic state (usually the 0) is represented physically by 'absence-of-signal'. The binary 1 is usually represented by a signal, for instance an electrical voltage, not equal than 1. Such a representation of logic states by magnitude based signals is not a requirement for performing n-state switching. For instance two logic states may be represented by two optical signals of two different wavelengths, for instance green and red. A state represented by a signal in that case has to be determined by distinguishing between wavelength of signals, and not by magnitude or intensity.

A state in an n-state signal may be represented by a magnitude of a signal, such as a voltage or a light intensity. It may also be represented by other characteristics of a signal, such as wavelength, or a presence of a certain material. The absence of signal may represent a state; it may also not represent a state. The term multi-valued, n-valued, multi-state or n-state herein means that a signal may assume one of n states, usually with n>2, without limiting the way how a state is represented. While the term valued is used, it may not be the actual value of a signal that determines a state represented by the signal.

A primary object of the present invention is to provide new multi-valued scrambler/descrambler systems that will overcome the shortcomings of the prior art devices.

In accordance with an aspect of the present invention, a method is provided for scrambling and descrambling a sequence of n-valued symbols using LFSR methods using reversible n-valued functions and n-valued reversible inverters.

In accordance with a further aspect of the present invention, a method is provided for binary implementation of functions and multipliers over an binary extension field $GF(2^m)$ in n-valued LFSR based scramblers and descramblers.

In accordance with another aspect of the present invention a method is provided for detecting n-valued sequences generated by an LFSR circuit using addition and multiplier functions over $GF(n)$.

In accordance with a further aspect of the present invention, apparatus is provided for scrambling and descrambling a sequence of n-valued symbols using LFSR methods using reversible n-valued functions and n-valued reversible inverters.

In accordance with another aspect of the present invention, apparatus is provided for binary implementation of functions and multipliers over an binary extension field $GF(2^m)$ in n-valued LFSR based scramblers and descramblers.

In accordance with another aspect of the present invention, apparatus is provided for detecting n-valued sequences generated by an LFSR circuit using addition and multiplier functions over $GF(n)$.

In accordance with a further aspect of the present invention, systems are provided applying the scrambling and descrambling methods of the present invention.

In accordance with another aspect of the present invention, a method is provided for processing a sequence of n-state symbols in binary form with a Linear Feedback Shift Register (LFSR), the LFSR having a plurality of inputs and a plurality of outputs, each input enabled to receive a signal representing a bit, comprising applying the LFSR for processing the sequence of n-state symbols in binary form, an n-state symbol able to assume one of n states with $n=2^p$ and $p \geq 2$ and an n-state symbol being represented by at least p bits, the LFSR having at least one device which implements an n-state truth table with at least p reversible binary logic functions; and selecting the processing from the group consisting of scrambling, descrambling and maximum length sequence generation.

In accordance with yet another aspect of the present invention, a method for processing a sequence of n-state symbols with an LFSR is provided, wherein at least one of the at least p reversible binary logic functions is an EQUIVALENT function.

In accordance with yet another aspect of the present invention, a method for processing a sequence of n-state symbols for $n=2^p$ with an LFSR is provided, wherein $p>2$.

In accordance with yet another aspect of the present invention, a method for processing a sequence of n-state symbols for $n=2^p$ with an LFSR is provided, the LFSR further comprising at least one device implementing in binary form a multiplication with a constant over $GF(n=2^p)$.

In accordance with yet another aspect of the present invention, a method for processing a sequence of n-state symbols for $n=2^p$ with an LFSR is provided, the LFSR further comprising at least one device implementing in binary form a zero-based n-state reversible inverter in binary form.

In accordance with yet another aspect of the present invention, a method for processing a sequence of n-state symbols for $n=2^p$ with an LFSR is provided, the LFSR further comprising at least one device implementing in binary form a non-zero-based n-state reversible inverter in binary form.

In accordance with yet another aspect of the present invention, a method for processing a sequence of n-state symbols for $n=2^p$ with an LFSR is provided, wherein the LFSR is an LFSR in Fibonacci configuration.

In accordance with yet another aspect of the present invention, a method for processing a sequence of n-state symbols for $n=2^p$ with an LFSR is provided, wherein the LFSR is an LFSR in Galois configuration.

In accordance with yet another aspect of the present invention, a method for processing a sequence of n-state symbols for $n=2^p$ with an LFSR is provided, wherein the LFSR is applied for scrambling and further comprising applying a second device implementing an n-state truth table with at least p reversible binary logic functions and having a first plurality of inputs each enabled to receive a bit from a plurality of bits representing an n-state symbol and a second plurality of inputs each enabled to receive a bit from a plurality of bits representing an n-state symbol and a plurality of outputs, receiving a plurality of bits representing an n-state symbol on the first plurality of inputs of the second device, connecting the second plurality of inputs of the second device to the plurality of outputs of the LFSR, connecting the plurality of outputs of the second device to the plurality of inputs of the LFSR and providing on the plurality of outputs of the second device a scrambled n-state symbol represented by at least p bits.

In accordance with yet another aspect of the present invention, a method for processing a sequence of n-state symbols for $n=2^p$ with an LFSR is provided, further comprising connecting the plurality of outputs of the second device to the plurality of inputs of the LFSR with a device implementing in binary form an n-state reversible inverter.

In accordance with yet another aspect of the present invention, a method for processing a sequence of n-state symbols for $n=2^p$ with an LFSR is provided, further comprising transforming the n-state symbol represented by at least p bits into an n-state signal able to assume one of at least n states.

In accordance with yet another aspect of the present invention, a method for processing a sequence of n-state symbols for $n=2^p$ with an LFSR is provided, wherein the LFSR is applied for generating a maximum length sequence of n-state symbols represented in binary form and the plurality of outputs of the LFSR is connected to the plurality of inputs of the LFSR.

In accordance with yet another aspect of the present invention, a method for processing a sequence of n-state symbols for $n=2^p$ with an LFSR is provided, wherein the plurality of outputs of the LFSR is connected to the plurality of inputs of the LFSR with an n-state reversible inverter in binary form.

In accordance with yet another aspect of the present invention, a method for processing a sequence of n-state symbols for $n=2^p$ with an LFSR is provided, wherein a correlation of the sequence with another sequence is determined by applying an n-state modified binary correlation method.

In accordance with a further aspect of the present invention, an n-state Linear Feedback Shift Register (LFSR) is provided as a means for processing in binary form a sequence of n-state symbols with $n=2^p$ and $p \geq 2$, an n-state symbol being able to assume one of n-states and each n-state symbol being represented by at least p bits, the processing being selected from the group consisting of scrambling, descrambling and maximum length sequence generation, comprising a plurality of inputs, enabled to receive at least p bits, a plurality of outputs, enabled to provide at least p bits, a shift register with k shift register elements with $k \geq 2$, each of the shift register elements enabled to store at least p bits representing an n-state symbol, a shift register elements having a plurality of at least p inputs and a plurality of at least p outputs; and a device which implements an n-state truth table with at least p reversible binary logic functions, the device having a first plurality of at least p inputs, a second plurality of at least p inputs, an input enabled to receive a bit, and a plurality of at least p outputs, an output being enabled to provide a bit, the first plurality of at least p inputs being connected to the output of at least p outputs of a shift register element of the shift register of the LFSR.

In accordance with another aspect of the present invention, an n-state Linear Feedback Shift Register (LFSR) is provided as a means for processing in binary form a sequence of n-state symbols with $n=2^p$ and $p \geq 2$, wherein the LFSR has a structure in accordance with a Galois configuration.

In accordance with yet another aspect of the present invention, an n-state Linear Feedback Shift Register (LFSR) is provided as a means for processing in binary form a sequence of n-state symbols with $n=2^p$ and $p \geq 2$, further comprising: a second device which implements an n-state truth table with at least p reversible binary logic functions, the device having a first plurality of at least p inputs, a second plurality of at least p inputs, an input enabled to receive a bit, and a plurality of at least p outputs, an output being enabled to provide a bit, wherein the first plurality of at least p inputs of the second device is enabled to receive a sequence of n-state symbols in binary form, the second plurality of at least p inputs of the second device is connected to the plurality of at least p outputs of the LFSR; and the plurality of at least p outputs of the second device is connected to the plurality of at least p inputs of the LFSR.

In accordance with yet another aspect of the present invention, an n-state Linear Feedback Shift Register (LFSR) is provided as a means for processing in binary form a sequence of n-state symbols with $n=2^p$ and $p \geq 2$, further comprising an n-state reversible inverter implemented in binary form with a plurality of at least p inputs and a plurality of at least p outputs, the n-state reversible inverter connecting the plurality of at least p outputs of the second device with the plurality of at least p inputs of the LFSR.

In accordance with yet another aspect of the present invention, an n-state Linear Feedback Shift Register (LFSR) is provided as a means for processing in binary form a sequence of n-state symbols with $n=2^p$ and $p \geq 2$, wherein the plurality of at least p outputs of the LFSR and the plurality of at least p inputs of the LFSR are directly connected.

In accordance with yet another aspect of the present invention, an n-state Linear Feedback Shift Register (LFSR) is provided as a means for processing in binary form a sequence of n-state symbols with $n=2^p$ and $p \geq 2$, further comprising an n-state reversible inverter implemented in binary form with a plurality of at least p inputs and a plurality of at least p outputs, the n-state reversible inverter connecting the plurality of at least p outputs of the LFSR with the plurality of at least p inputs of the LFSR.

In accordance with yet another aspect of the present invention, a method for processing a sequence of n-state symbols in binary form with a Linear Feedback Shift Register (LFSR), the LFSR having a plurality of inputs and a plurality of outputs, each input enabled to receive a signal representing a bit, comprising applying the LFSR for processing the sequence of n-state symbols in binary form, an n-state symbol able to assume one of n states with $n=2^p$ and $p \geq 2$ and an n-state symbol being represented by at least p bits, the LFSR having at least one device which implements an n-state truth table with at least p reversible binary logic functions; and selecting the processing from the group consisting of scrambling and descrambling.

BRIEF DESCRIPTION OF THE DRAWINGS

Various other objects, features and attendant advantages of the present invention will become fully appreciated as the same becomes better understood when considered in conjunction with the accompanying drawings, and wherein.

DETAILED DESCRIPTION OF THE INVENTION

An n-valued or n-state symbol can have one of n-states with $n>2$. An n-state symbol can be represented by a signal that can assume one of n states. An n-state symbol can also be represented by a plurality of k-state symbols with $k<n$. A k-state symbol can be represented by a signal that can assume one of k states. Accordingly, an n-state symbol can be represented by a plurality of k-state signals. For instance, an 8-state symbol can be represented by at least 2-state symbols. The finite field $GF(n=2^p)$ may be an extension of the finite binary field $GF(2)$. If the field $GF(2)$ is defined in using 2-valued arithmetic, then the field $GF(n=2^p)$ may be defined using similar operations to define elements in $GF(n=2^p)$ wherein a symbol in $GF(n=2^p)$ may be represented by a word of p bits.

An n-state symbol may be processed by an n-valued logic function. Under certain circumstances an n-state symbol may be represented by a plurality of k-state symbols with $k<n$ and the plurality of k-state symbols may be processed by a plurality of k-valued logic functions. The result of such a processing may be another plurality of k-state symbols representing an n-state symbol. Under certain conditions the processing of a first plurality of k-state symbols representing a first n-state symbol with a first plurality of k-state logic functions will generate a second plurality of k-state symbols representing a second n-state symbol. This processing by a plurality of k-valued functions is equivalent to the processing of the first n-state symbol by a first n-valued logic function into the second n-state symbol when $GF(k^p)$ is an extension field of $GF(k)$.

Herein a field $GF(n=2^p)$ will be called an extension field or and extension finite field or an extended field of $GF(2)$. Because binary operations are currently the preferred switching technology at the time of the invention, the examples provided herein use binary extension fields. It is to be understood that extension fields for other values of k may be created and applied and are fully contemplated.

Figure 1:
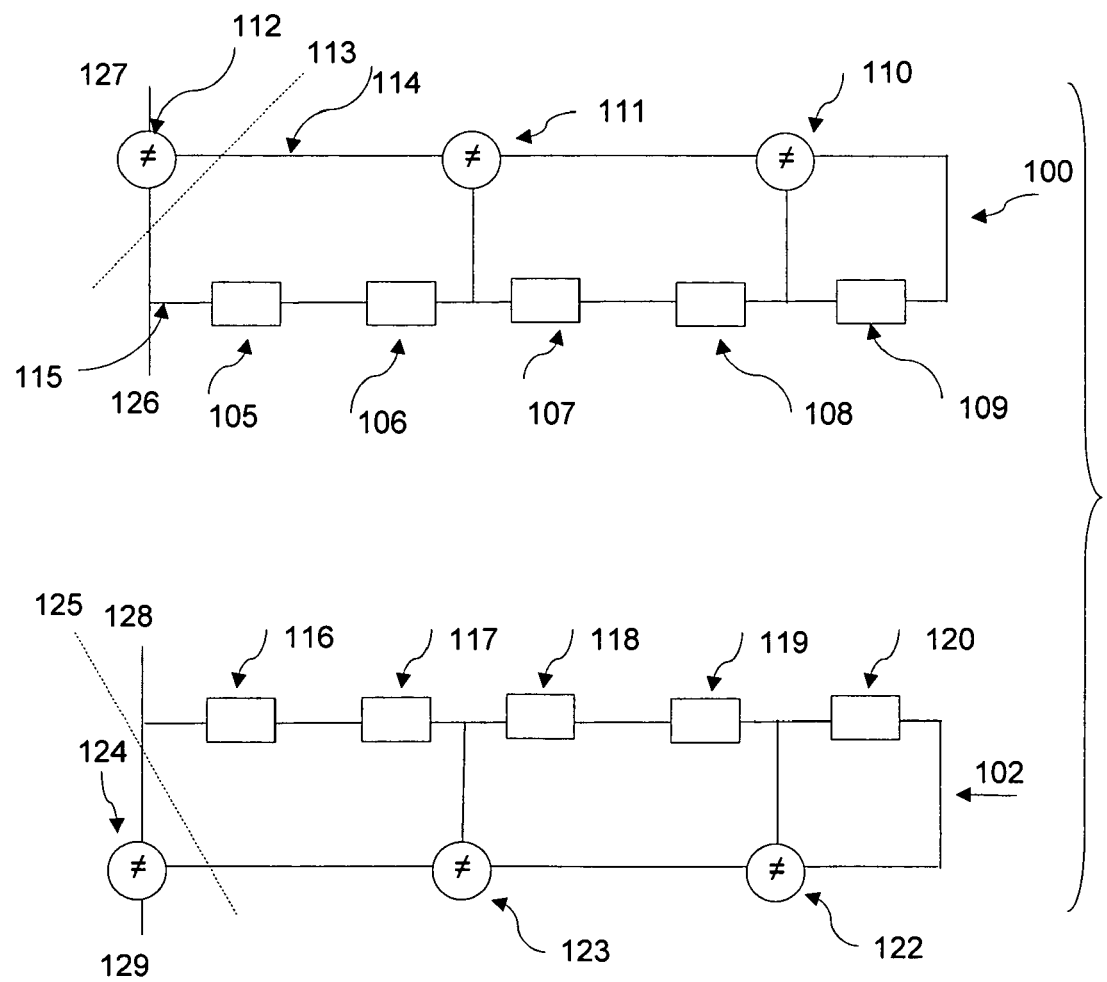
FIG. 1 is a diagram showing a combination of a binary LFSR based scrambler and descrambler.

FIG. 1 shows a known LFSR based binary scrambler 100 and its corresponding descrambler 102 in Fibonacci configuration. The scrambler 100 is comprised of an LFSR (the diagram to the right of line 113 in FIG. 1) with shift register elements 105, 106, 107, 108 and 109. It also has two binary functions XOR 110 and 111. The output 114 of XOR 111 may be considered an output of the LFSR. The input 115 to shift register element 105 is an input to the LFSR. XOR function 112 is the scrambling function for this scrambler. The to be scrambled signal is provided on input 127. The scrambled signal is outputted on the output of 112 and is also provided on 126.

The corresponding descrambler 102 may be considered a mirror image of the scrambler. The LFSR of the descrambler is to the right of the line 125. The LFSR has the shift register elements 116, 117, 118, 119 and 120 and the XOR functions 122 and 123. The descrambling function is XOR 124. The to be descrambled signal is provided on 128 and the descrambled signal is provided on 129. In accordance with the rules for corresponding descramblers, the LFSR of the n-valued descrambler (including n=2) should be the same as the LFSR of the scrambler: same number of shift register elements, same taps, same functions as in the corresponding scrambler and the descrambling function in the descrambler should be the reversing function to the scrambling function in the scrambler. Because the scrambling function is a XOR, which is self-reversing, the descrambling function is also a XOR.

In the case of a binary LFSR, the shift register is able to accept, retain and output binary signals. In the case of an n-state scrambler or in case of another n-state processing device, the shift register has memory elements that can accept, save and output n-state signals.

An LFSR works under the control of a control signal such as a clock signal to shift-and-store. Such a clock signal is assumed in an LFSR, though not usually shown in figures herein to keep diagrams less cluttered.

Figure 2:
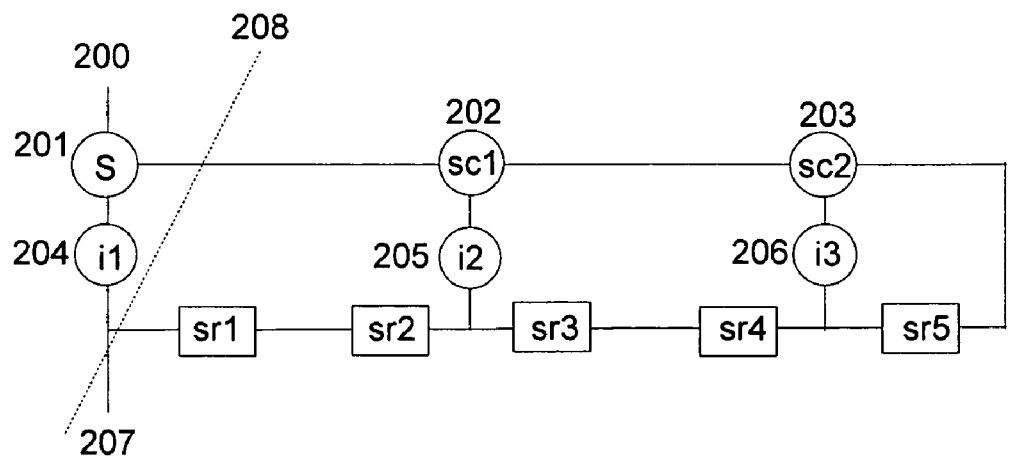
FIG. 2 is a diagram showing an n-valued Linear Feedback Shift Register (LFSR) based scrambler in accordance with an aspect of the present invention.

FIG. 2 shows a generic diagram of an n-valued LFSR based scrambler. The LFSR has the shift register elements sr1, sr2, sr3, sr4 and sr5; each of which can shift and store an n-valued symbol. The LFSR has also two n-valued reversible functions: function sc1 in 202 and function sc2 in 203. In the non-binary case a function is connected to an output of a shift register element through an n-valued reversible inverter. As was shown in cited patent application Ser. No. 10/935,960, an n-valued function with an inverter at an input can be replaced by another n-valued function which will be called an inverter reduced function. The inverter reduced function should also be a reversible function in order for the scrambler to be reversible. Accordingly, the inverter has to be a reversible inverter. The concept of n-valued reversible inverters has been extensively explained in cited patent application Ser. No. 10/935,960.

N-valued multiplication modulo-n with a constant factor when n is a prime number are reversible inverters. When n is not prime then multipliers such as the ones over modulo-n may not be reversible. For instance, for n=4 some multipliers are not reversible. Multiplication by 3 modulo-4 provides the inverter [0 3 2 1] as: 0×3 mod-4=0; 1×3 mod-4=3; 2×3 mod-4=2; and 3×3 mod-4=1, which is a reversible inverter. However multiplication by 2 modulo-4 is non reversible: as: 0×2 mod-4=0; 1×2 mod-4=2; 2×2 mod-4=0; and 3×2 mod-4=2, which is [0 2 0 2] a non-reversible inverter.

It is known that one can create reversible additions and multiplications by generating an extension field $GF(p^m)$, wherein p is a prime number.

The n-valued scrambler of FIG. 2 has the LFSR to the right of line 208. The taps in the LFSR have the constant n-valued multipliers i2 at 205 and i3 at 206, which are n-valued reversible inverters. Furthermore, the scrambler has an n-valued scrambling function S at 201, which receives a to be scrambled signal on input 200 of function S. The function S is also inputted with a signal from the LFSR. Furthermore, the n-valued scrambling function S has a multiplier i1 at 204 which is a reversible inverter. A scrambled signal is outputted on 207.

Figure 3:
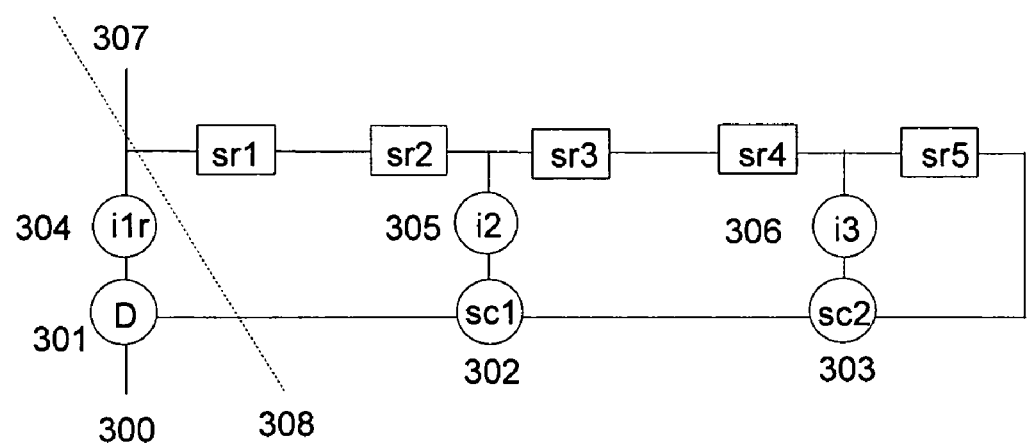
FIG. 3 is a diagram showing an n-valued Linear Feedback Shift Register (LFSR) based descrambler in accordance with an aspect of the present invention.

FIG. 3 shows a diagram of the corresponding descrambler of FIG. 2. Its LFSR is to the right of line 308, and is identical to the LFSR of the scrambler with reversible functions sc1 and sc2 at 302 and 303, inverter i2 at 305, and inverter i3 at 306, applying the same taps. The to be descrambled signal is provided on input 307. The signal is inputted into the LFSR and to an inverter i1r at 304, which is the reversing inverter of i1 in FIG. 2. The signal from i1r is inputted into descrambling function D at 301, which is the reversing function of function S of the scrambler. The LFSR also inputs into D and the descrambled signal is provided on output 300 of the descrambling function D.

The 4-Valued or 4-State Case

A truth table of the addition over GF(4) is provided in the following table.

| +GF(4) | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

A truth table of a multiplication over GF(4) is provided in the following table.

| ×GF(4) | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

One may apply the addition over GF(4) as functions S, sc1 and sc2 in FIG. 2 if one implements a scrambler as provided in FIG. 2 in 4-state logic in GF(4), which may be implemented in binary form. A multipliers i1, i2 and i3 one may use the multipliers as provided in the above table.

One may apply the addition over GF(4) then also as functions D, sc1 and sc2 in the 4-state descrambler of FIG. 3. The multipliers i1r, i2 and i3 may be selected from the multiplication over GF(4).

The multipliers are what is called herein zero-based n-state reversible inverters, as state 0 remains 0 after inversion or multiplication. For instance [0 2 3 1] is a zero-based 4-state reversible inverter. One may also apply other zero-based inverters which are not multipliers over GF(4). For instance [0 2 1 3] is a zero-based 4-state reversible inverter which is not a multiplier over GF(4). One may also apply non-zero-based n-state reversible inverters, which can not be a multiplication over GF(n). For instance [3 2 1 0] is a non-zero-based 4-state reversible inverter. Its reverse is also [3 2 1 0], so this 4-state inverter is self-reversing.

The 8-Valued or 8-State Case

As an example of a scrambler in a Galois Field GF(8) will be used. The following tables provide the truth tables for an addition 'fp' over GF(8), multiplication 'mul' over GF(8) and the reverse of the multiplications 'div' over GF(8).

| | | | | | b | | | | |
|---|---|---|---|---|---|---|---|---|---|
| c | fp | 0 | 1 | 2 | 3 | 4 | 5 | 6 | 7 |
| a | 0 | 0 | 1 | 2 | 3 | 4 | 5 | 6 | 7 |
| | 1 | 1 | 0 | 4 | 7 | 2 | 6 | 5 | 3 |
| | 2 | 2 | 4 | 0 | 5 | 1 | 3 | 7 | 6 |
| | 3 | 3 | 7 | 5 | 0 | 6 | 2 | 4 | 1 |
| | 4 | 4 | 2 | 1 | 6 | 0 | 7 | 3 | 5 |
| | 5 | 5 | 6 | 3 | 2 | 7 | 0 | 1 | 4 |
| | 6 | 6 | 5 | 7 | 4 | 3 | 1 | 0 | 2 |
| | 7 | 7 | 3 | 6 | 1 | 5 | 4 | 2 | 0 |

| | | | | | b | | | | |
|---|---|---|---|---|---|---|---|---|---|
| c | mul | 0 | 1 | 2 | 3 | 4 | 6 | 5 | 7 |
| a | 0 | 0 | 0 | 0 | 0 | 0 | 0 | 0 | 0 |
| | 1 | 0 | 1 | 2 | 3 | 4 | 5 | 6 | 7 |
| | 2 | 0 | 2 | 3 | 4 | 5 | 6 | 7 | 1 |
| | 3 | 0 | 3 | 4 | 5 | 6 | 7 | 1 | 2 |
| | 4 | 0 | 4 | 5 | 6 | 7 | 1 | 2 | 3 |
| | 5 | 0 | 5 | 6 | 7 | 1 | 2 | 3 | 4 |
| | 6 | 0 | 6 | 7 | 1 | 2 | 3 | 4 | 5 |
| | 7 | 0 | 7 | 1 | 2 | 3 | 4 | 5 | 6 |

| c | div | 0 | 1 | 2 | 3 | 4 | 5 | 6 | 7 |
|---|---|---|---|---|---|---|---|---|---|
| a | 0 | 0 | 0 | 0 | 0 | 0 | 0 | 0 | 0 |
| | 1 | 0 | 1 | 2 | 3 | 4 | 5 | 6 | 7 |
| | 2 | 0 | 7 | 1 | 2 | 3 | 4 | 5 | 6 |
| | 3 | 0 | 6 | 7 | 1 | 2 | 3 | 4 | 5 |
| | 4 | 0 | 5 | 6 | 7 | 1 | 2 | 3 | 4 |
| | 5 | 0 | 4 | 5 | 6 | 7 | 1 | 2 | 3 |
| | 6 | 0 | 3 | 4 | 5 | 6 | 7 | 1 | 2 |
| | 7 | 0 | 2 | 3 | 4 | 5 | 6 | 7 | 1 |

Arithmetic over GF(8) has advantages that will be used. The following will provide rules for arithmetic in $GF(2^3)$ using the definition of 'fp' for addition and 'mul' for multiplication as shown in the respective truth tables. There are several rules that can be derived from the truth tables.

First rule: For every x (wherein x is a variable that can have one of 8 states) 'x fp x=0'. Or fp(x,x)=0. Or, to use the terms of +, * and ÷: x+x=0 in this $GF(2^3)$.

Second rule: The reverse of fp is the function itself. Or the function fp is self-reversing. Or again in the terms of arithmetic of this $GF(2^3)$: c=a+b→a=c−b or a=c+b=b+c, as the function is also commutative.

Third rule: Dividing by a factor α is identical to multiplying by a factor β. In fact multiplying a variable x by a constant α in the $GF(2^3)$ is identical to inverting the variable x=[0 1 2 3 4 5 6 7] by the inverter representing the factor α.

Assume that α=5. In the multiplier this means the row representing α=5 in multiplier truth table 'mul'; or the inverter [0 5 6 7 1 2 3 4]. Dividing by 5 in the GF($2^3$) is multiplying by β=$5^{-1}$. In that case α*β=5*$5^{-1}$=1. Or in terms of inversion one may conclude that the inverter represent β=$5^{-1}$ in GF($2^3$) should reverse the inverter representing α=5. One can easily check that the reversing inverter is then β=4 or [0 4 5 6 7 1 2 3]. The previous table shows the division table 'div' as the inverse to 'mul' in the GF($2^3$), wherein only the rows have significance for this case. The inversion rules are: $1^{-1}$=1; $2^{-1}$=7; $3^{-1}$=6; $4^{-1}$=5; $5^{-1}$=4; $6^{-1}$=3; $7^{-1}$=2.

Assume the scrambler of FIG. 2 to be an 8-valued scrambler wherein functions D, sc1 and sc2 are identical to the 8-valued addition fp over GF(8). Assume i2 to be a multiplier 2, i3 to be a multiplier 3 and i1 a multiplier 4 over GF(8). The 8-valued descrambler of FIG. 3 then has of course sc1 and sc2 to be fp. Because 'fp' is self reversing and S=fp, then D=fp. The inverter i1r is the reversing inverter for multiplication by i1=4 is i1r=5=[0 5 6 7 1 2 3 4].

Take as an input sequence to the 8-valued scrambler of FIG. 2 with [sr1 sr2 sr3 sr4 sr5]=[0 1 2 3 4] and sigin=[1 2 3 4 5 0 6 7 0 1 2 3 4 5 0 6 7 7 7 7 7]. This will generate a scrambled sequence of 8-valued symbols: Line=[1 3 0 4 5 4 6 6 7 3 4 4 0 7 7 5 2 0 1 3 5].

The 8-valued descrambler of FIG. 3 then has all the same functions 'fp', as 'fp' is self reversing. The only change is that i1r=5. One can demonstrate the self-synchronizing character of the descrambler of FIG. 3 by using for instance [1 1 1 1 1] as the initial state. Providing the earlier determined output of the scrambler to the descrambler will generate: Res=[1 2 6 6 6 0 6 7 0 1 2 3 4 5 0 6 7 7 7 7 7]. This sequence only differs from the unscrambled signal until the different initial state was flushed.

There is a particular advantage to a multi-valued scrambler/descrambler combination over a binary extension field GF($2^m$). First of all addition over GF($2^m$) can be achieved by taking the binary representation of two n-valued symbols and adding the individual bits representing an 8-valued symbol in modulo-2 or by processing corresponding binary symbols of binary word representation of n-valued symbols in GF($2^p$) by using the binary XOR function. Assume as an illustrative example again functions fp and mul over GF(8). Adding via fp two 8-valued symbols a1=[x11 x12 x13] and a2=[x21 x22 x23] is: a1 fp a2→[(x11≠x21) (x12≠x22) (x13≠x23)]. This is fairly easy to realize.

In general, multiplication is a problematic operation, accomplished by multiple shift and add operations. It may be faster to use the actual multiplication truth table. However, a good alternative that is easy to implement is to use the binary equivalent.

A GF($2^m$) is usually defined by the elements of a primitive polynomial. Multiplication of these elements is then defined as adding the exponents of the multiplying components. Because the primitive polynomial of GF($2^m$) can be expressed in a binary LFSR of degree m, multiplication by a factor p in GF($2^m$) means moving up in the state of the LFSR by (p−1) states. In other words multiplying by 2 is moving up one position (or 1 clock cycle) in the LFSR.

Figure 4:
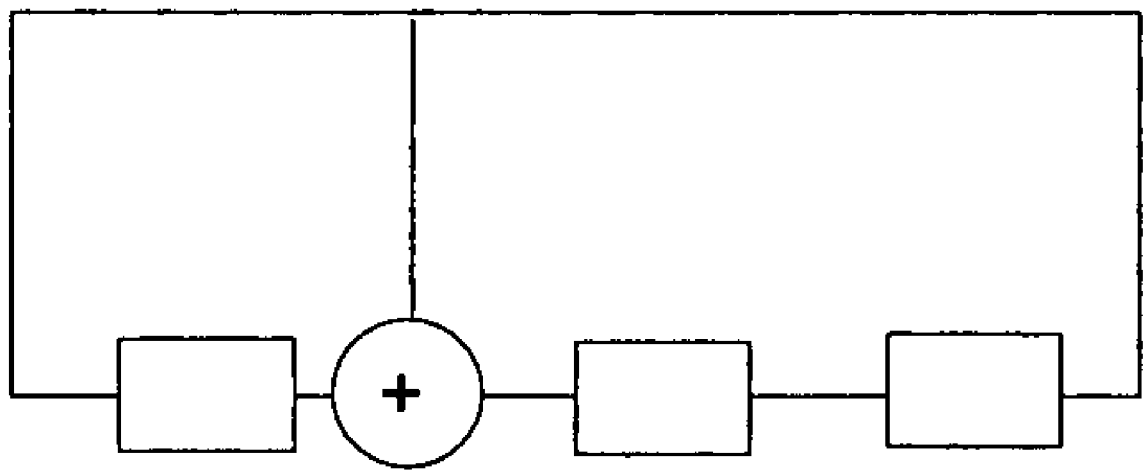
FIG. 4 is a diagram of a binary LFSR implementing a primitive polynomial.

For instance, the states of GF(8) can be created by the LFSR in Galois configuration of FIG. 4 starting with [1 0 0] as state 1. The unit state α is then [0 1 0]. Multiplying by a factor α is moving up one state. Multiplying by $α^4$ is moving up 4 states or having the LFSR run for 4 clock cycles. The product x*$α^4$ is starting the LFSR in state x and moving up 4 clock cycles.

The states of this GF(8) are provided in the following table

| state | | | |
|---|---|---|---|
| 0 | 0 | 0 | 0 |
| $α^0$ | 1 | 0 | 0 |
| $α^1$ | 0 | 1 | 0 |
| $α^2$ | 0 | 0 | 1 |
| $α^3$ | 1 | 1 | 0 |
| $α^4$ | 0 | 1 | 1 |
| $α^5$ | 1 | 1 | 1 |
| $α^6$ | 1 | 0 | 1 |

The above table of GF(8) is provided in the article by Bernard Sklar: "Reed Solomon Codes" which is available on the WWW from URL http://www.facweb.iitkgp.ernet.in/~pallab/mob_com/art_sklar7_reed-solomon.pdf.

One can also determine the following states of an LFSR by logic expressions starting from an initial state. For instance, start the LFSR from an initial state [x1 x2 x3] and determine the expressions for the following states. These following states are provided for the example in the following table.

| | | | |
|---|---|---|---|
| *1 | x1 | x2 | x3 |
| *2 | x3 | x1 | x2 + x3 |
| *3 | x2 + x3 | x3 | x1 + x2 + x3 |
| *4 | x1 + x2 + x3 | x2 + x3 | x1 + x2 |
| *5 | x1 + x2 | x1 + x2 + x3 | x1 + x3 |
| *6 | x1 + x3 | x1 + x2 | x2 |
| *7 | x2 | x1 + x3 | x1 |
| *8 = *1 | x1 | x2 | x3 |

The table shows how one can execute multiplication in GF(8) by inputting the variable a=[x1 x2 x3] that one wants to multiply by a constant into a binary expression that applies the function '+', which is of course the modulo-2 addition or XOR function. Accordingly, one can execute all functions in GF($2^m$) that are required to perform the functions of a scrambler or descrambler in GF($2^m$) by using binary logic functions and in particular by using the binary XOR function.

The examples were provided in GF(8). To those skilled in the art it should be clear that this can be applied to any GF($2^m$). Implementation of adders and multiplications over GF(n=$2^p$) in n-valued processing devices such as scramblers and descramblers is an aspect of the present invention. Those n-valued or n-state processing devices can be implemented in binary logic. A shift register in a binary implementation of a device over GF(n=$2^p$) comprises for instance register elements that can input, hold and shift out plurality of words. For instance, elements in a shift register over GF(8) can be inputted with words of 3 bits and can output words of 3 bits. An LFSR over GF(32) for instance has elements that can hold words of 5 bits. An adder function over GF(32) in binary form processes 2 words of 5 bits as inputs and generates a word of 5-bits.

Bits in binary words in GF(n=$2^p$) can be processed independently. This means that bits in binary words can be processed sequentially, perhaps as one bit per clock pulse and with a keeping of synchronization of words. In such an embodiment resources such as switches may be shared. One may also process bits in words in parallel, thus for instance processing all bits in a word at the same time. This requires more resources, but takes place faster.

In a further embodiment, an adder function and an LFSR over GF(n=$2^p$) may also process n-state symbols, without reducing an n-state symbol first to a binary word.

The scrambler and descrambler of FIG. 2 and FIG. 3 are shown in Fibonacci configuration. It should be appreciated that the same approach applies to a scrambler and descrambler in Galois configuration be it in $GF(2^m)$ or any other value of n>2.

Figure 5:
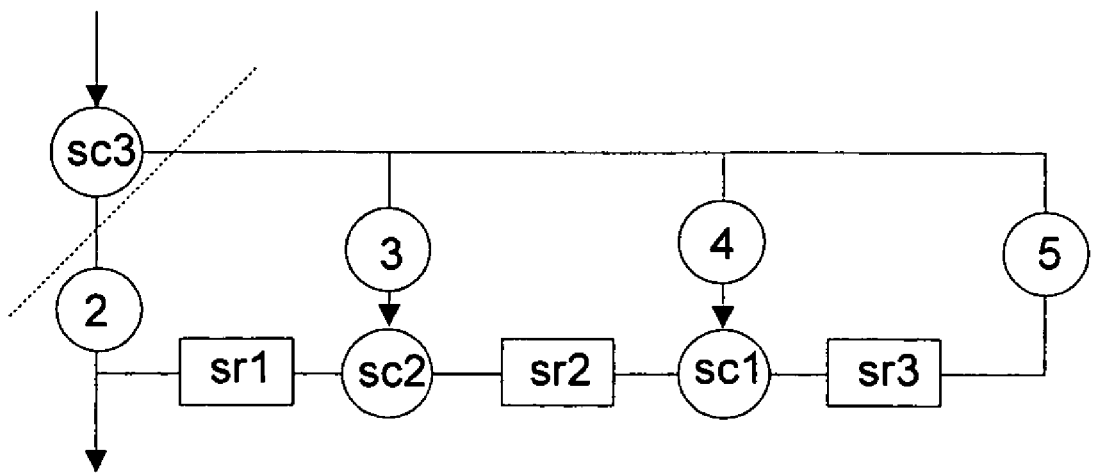
FIG. 5 is a diagram showing an n-valued Linear Feedback Shift Register (LFSR) based scrambler in accordance with an aspect of the present invention.
Figure 6:
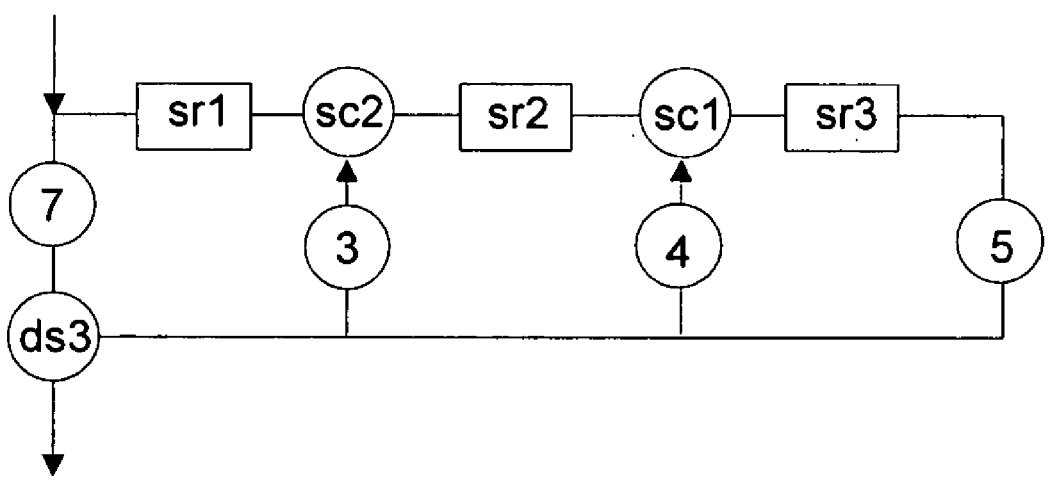
FIG. 6 is a diagram showing an n-valued Linear Feedback Shift Register (LFSR) based descrambler in accordance with an aspect of the present invention.

As an illustrative example in FIG. 5 and FIG. 6, an 8-valued scrambler and descrambler in Galois configuration with a 3-element shift register are provided. The scrambler uses multipliers 2, 3, 4 and 5 and all functions in the scrambler and descrambler are additions over GF(8). The descrambler of FIG. 6 is almost a mirror image of the scrambler of FIG. 5. The multiplier to an input of the descrambling functions ds3 is the reverse of 8-valued multiplier 2 over GF(8) in the scrambler and is 7.

The Galois descrambler of FIG. 6 is not self synchronizing. Synchronization between scrambler and descrambler is required. For completeness in FIG. 7 and FIG. 8 a scrambler and a self-synchronizing descrambler in Galois configuration (for the 8-valued case over GF(8)) are provided. The details of self-synchronizing scramblers and descramblers are provided in U.S. patent application Ser. No. 11/696,261, filed on Apr. 4, 2007, entitled Binary and N-Valued LFSR and LFCSR Based Scramblers, Descramblers, Sequence Generators and Detectors in Galois Configuration, which is incorporated herein by reference in its entirety. It should be clear that the binary methods for realizing the addition and multiplication over $GF(2^m)$ can also be applied in those configurations.

Detection of N-Valued Sequences

It was shown by the inventor that n-valued sequences generated by an n-valued LFSR can be detected by a descrambler like n-valued LFSR circuit in U.S. patent application Ser. No. 11/065,836, filed Feb. 25, 2005, entitled Generation and Detection of Non-Binary Digital Sequences which is incorporated herein by reference in its entirety. For illustrative purposes, a detector in Fibonacci configuration is provided. Similar detectors may also be created for sequences generated by Galois configurations. However, it should be clear that the non self-synchronizing detector in Galois configuration requires complete synchronization with the corresponding generator to correctly detect an n-state sequence.

Figure 9:
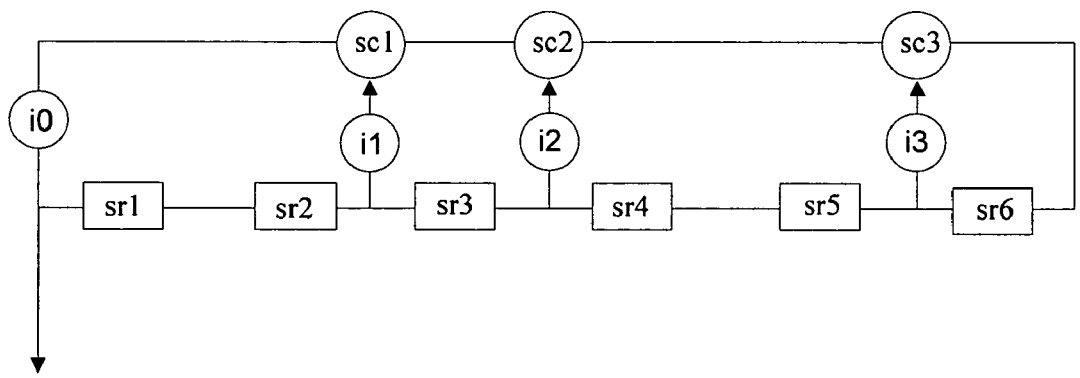
FIG. 9 is a diagram of an n-valued LFSR based sequence generator.
Figure 10:
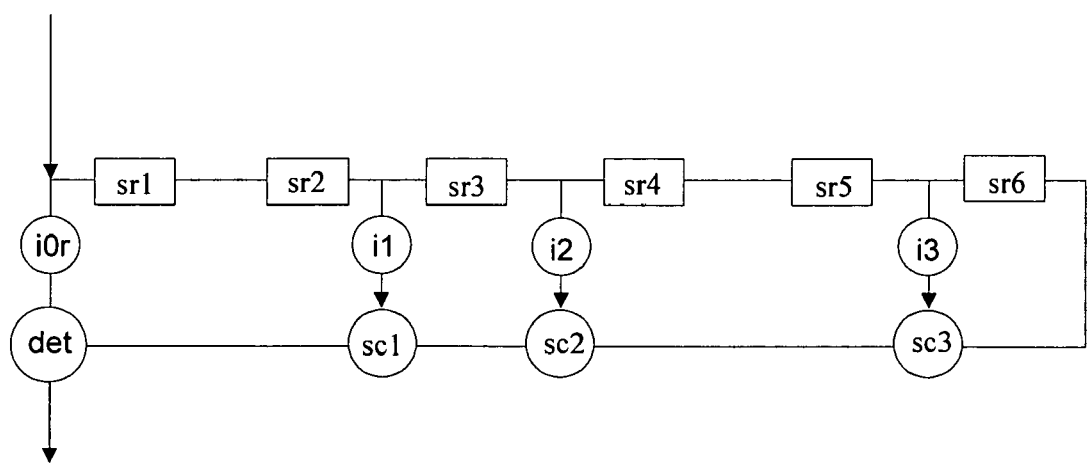
FIG. 10 is a diagram of an n-valued LFSR based detector of an n-valued sequence in accordance with an aspect of the present invention.

FIG. 9 shows an n-valued LFSR sequence generator in Fibonacci configuration. One may assume for illustrative purposes, that n=8 and that sc1, sc2 and sc3 are all additions over GF(8) while inverters i0, i1, i2 and i3 are all multipliers over GF(8). One can detect a sequence generated by the sequence generator of FIG. 9 by the LFSR based circuit of FIG. 10. Herein, inverter i0r reverses i0. Furthermore, a detection function 'det' is used. If the sequence inputted on the circuit of FIG. 10 was generated by the circuit of FIG. 9 then both inputs to function 'det' after the shift register is flushed are identical. Accordingly, if the truth table of 'det' has a diagonal with identical states, then the output of 'det' will generate a sequence of identical symbols, this indicating a correct detection. The addition over $GF(2^m)$ has a diagonal with states 0, and can serve as a detecting function. Accordingly, n-valued sequence detectors as shown in FIG. 10 using inverters or multipliers and addition function defined in $GF(2^m)$ can be implemented using the binary XOR functions as described earlier. This also applies to LFSR based sequence detectors in Galois configuration.

The present invention provides different ways of realizing LFSR based n-valued scramblers, descramblers and sequence detectors using n-valued reversible inverters and reversible n-valued functions. Binary methods for implementing addition and multiplier functions over $GF(2^m)$ have been applied. While Galois Field arithmetic is known and is applied in LFSR based coders in for instance for Reed Solomon coders, it is believed that applying binary implementation of GF arithmetic to n-valued scramblers, descramblers and sequence detectors is novel.

Figure 11:
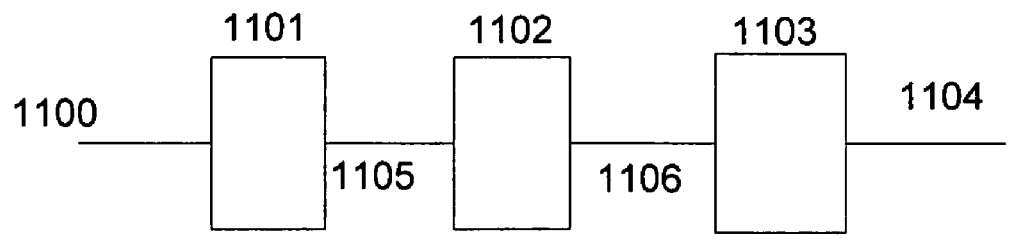
FIGS. 11-14 show diagrams of a system in accordance with an aspect of the present invention.

FIG. 11 is a diagram of a possible realization of a scrambler, descrambler or sequence detector as an aspect of the present invention. A sequence of n-valued symbols is entered on input 1100 to an analog/digital converter 1101 which outputs words of binary symbols on 1105. These binary words are inputted to 1102 which will perform in binary mode the scrambling, descrambling or detection functions described above. The result may be outputted as binary words on 1106 to a digital/analog converter 1103 which outputs n-valued symbols on 1104.

Figure 12:
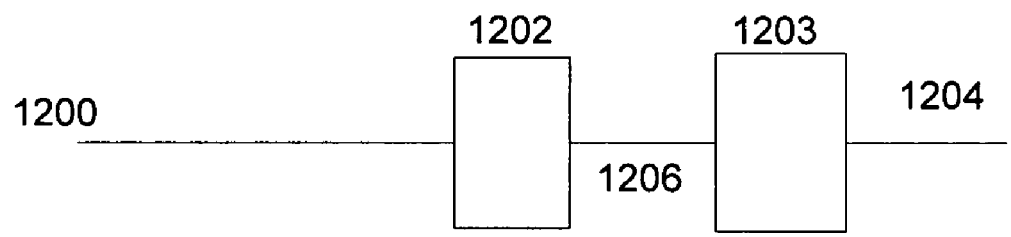

Different configurations of such a set-up are possible. For instance, it is possible that n-valued symbols are used for transmission but not for processing. This may be the case wherein scrambling is among the final steps before transmission. This is shown in FIG. 12 wherein a binary signal is provided on 1200 to a processing unit 1202 that for instance performs the n-valued scrambling steps in binary form. This processing unit will take each number of for instance p consecutive bits to represent an n-valued symbol. For instance p=3 and n=8. After creating words of p bits which form a sequence of scrambled n-valued symbols the binary words may be provided on 1206 to a digital/analog converter 1203 that outputs n-valued symbols on 1204. For instance, a DSL signal that uses a 4-valued line signal may apply this set-up.

Figure 13:
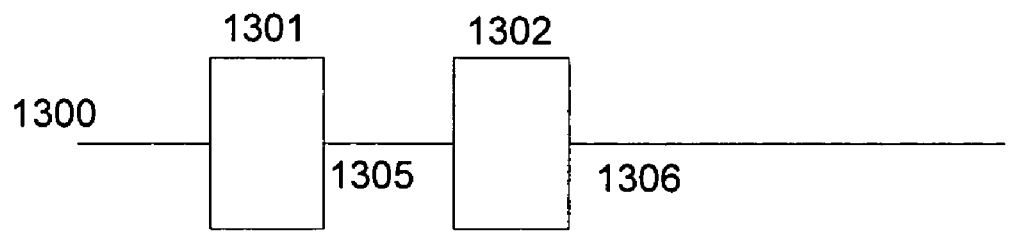

A potential receiver for the system of FIG. 12 is shown in FIG. 13. Herein, the n-valued symbols are provided on 1300 to an analog/digital converter 1301 that outputs binary words on 1305 which will provide the binary words to a binary processing unit 1302 which will perform for instance the n-valued descrambling or detection operation in binary form. A binary descrambled or detection signal is then provided on 1306 for further processing. This may take place in for instance a receiving device of an n-valued transmission system.

It should be clear that there are many ways to create an n-valued or n-state signal. A state may be represented by an intensity or level of a physical phenomenon such as a current. A state may be represented by a position of a signal in time as in pulse position coding. A state may be represented by a phase of a signal, a color, polarization, amount of spin, spin orientation or any other phenomenon that can assume different states.

Figure 14:
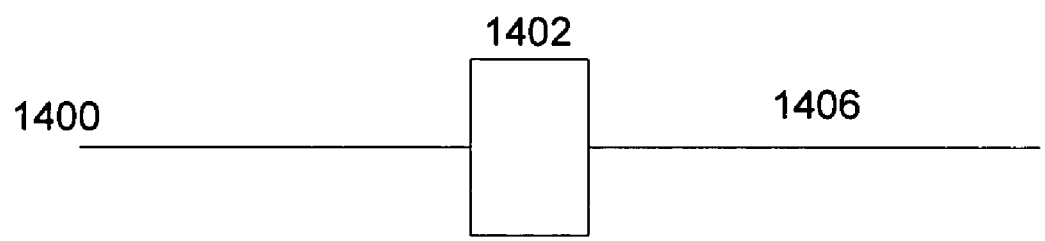

The n-valued scrambling, descrambling and detection methods can also be performed exclusively in binary form as is shown in FIG. 14. Herein, a sequence of binary symbols is processed by a unit 1402 which will treat for instance a series of p bits provided on 1400 as a binary word. The result is provided on 1406. For the casual observer it will appear as if an incoming sequence of bits is processed into an outgoing stream of bits. The system of FIG. 14 requires that word synchronization for the purpose of descrambling and detection is maintained. At the limited cost of synchronization a substantial level of security may be added to the signal by performing n-valued scrambling in binary form to binary signals. In order to break up patterns that may exist in binary words one may consider including a binary scrambling or transposition step to the process. Again, for the casual observer, it may be unclear how a received binary signal was modified if n-valued scrambling was used, circumventing the obvious cryptanalysis techniques.

It was shown above that a Linear Feedback Shift Register (LFSR) can be provided in different configurations. It was also shown that a combination of a function and inverters can be consolidated into a single function. It should be clear that one may combine two or more inverters into one inverter. The one configuration that may appear to be novel is the Fibonacci configuration wherein an inverter is placed in the shift register between two shift register elements. For illustrative purposes, such situations will be analyzed by using an LFSR based n-valued sequence generator. If one can find two different configurations of the LFSR having the same number of shift register elements and generating the same equivalent sequence then one may call those two configurations equivalent. A complete sequence generated by a sequence generator having a first initial state is equivalent to a second sequence generated by the same sequence generator but with a different initial shift register. These equivalent sequences are then shifted versions of each other. However, their generators are identical.

Figure 15:
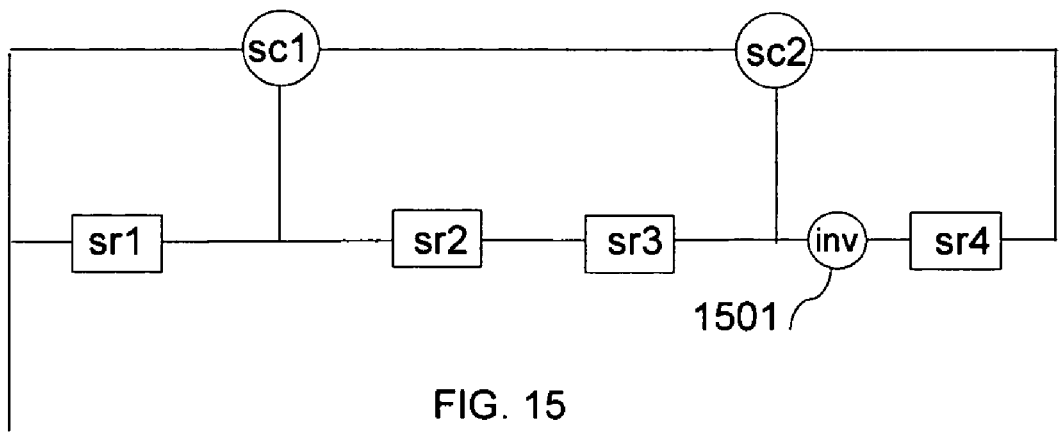
FIG. 15-18 show diagrams of a sequence generators in different embodiments.
Figure 16:
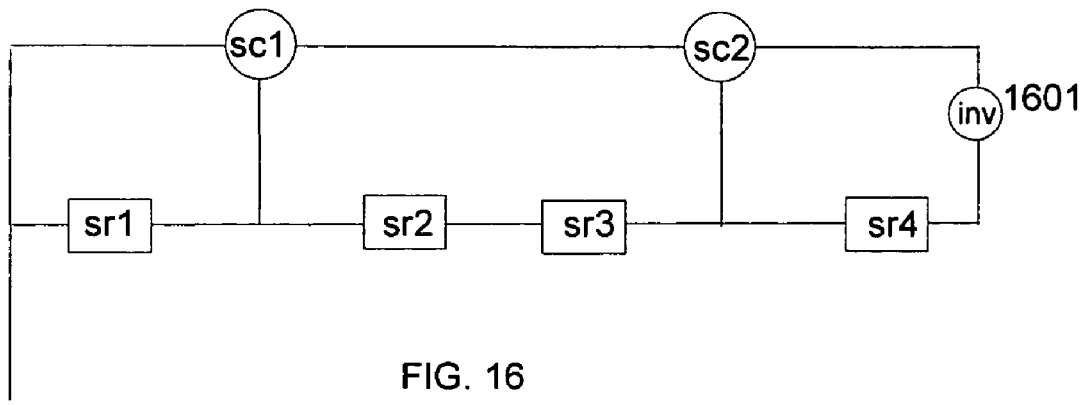

FIG. 15 shows an LFSR based sequence generator with a 4 element shift register and two functions sc1 and sc2 in the feedback taps. An inverter 1501 (inv) is placed just in front of the 4$^{th}$ shift register element. It is easy to see that the function receives from shift register element sr4 a value that is inverter by an inverter 'inv'. Accordingly, one may place the inverter also after the shift register element 'sr4'. This is shown in FIG. 16 wherein the inverter 'inv' is now in position 1601. Unfortunately, this situation is only correct after the initial value of 'sr4' is flushed. By changing the initial state of the shift register of the generator of FIG. 16 one may generate the same sequence as generated by the generator of FIG. 15.

In an example one may apply a 4-state generator wherein functions 'sc1' and 'sc2' are both adders over GF(4) and the inverter is for instance a multiplication over GF(4) by a factor 3. It will turn out that the generator of FIG. 15 with initial state [0 2 1 3] will generate the same sequence as the generator of FIG. 16 with initial state [0 2 1 1].

Figure 17:
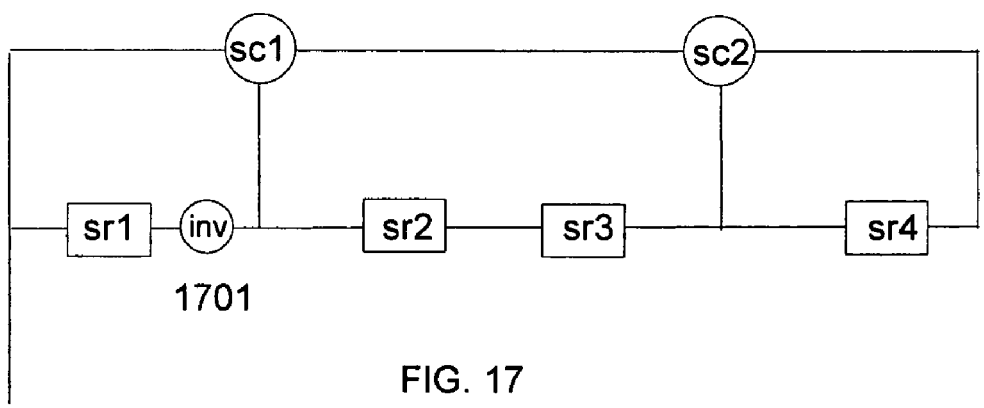
Figure 18:
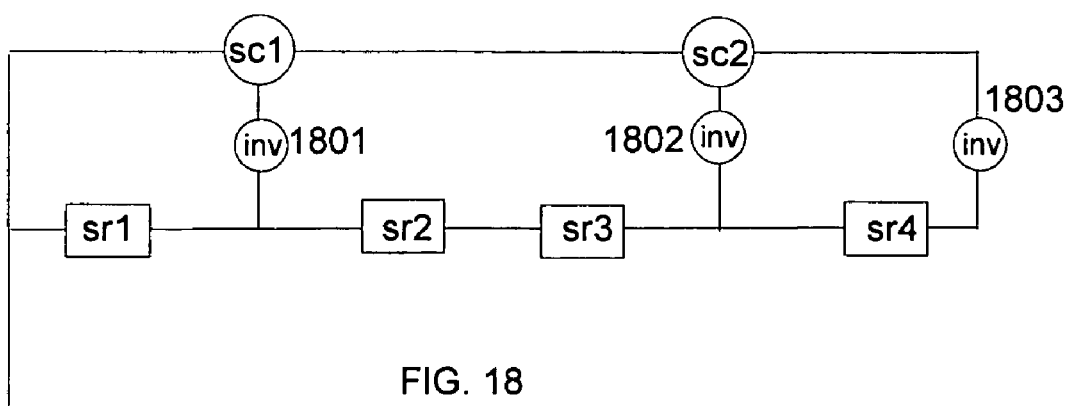

One may create different configurations such as shown in FIG. 17 with an inverter 1701 'inv' in front of the tap to function 'sc1' and the second element 'sr2' of the shift register. This configuration is equivalent to the configuration of FIG. 18 with inverters 'inv' at locations 1801, 1802 and 1803. For instance the configuration of FIG. 17 with initial shift register content [0 2 1 3] in 4-state mode is equivalent to the generator of FIG. 18 with initial state [0 3 2 1]. Accordingly, inclusion of inverters in the shift register is equivalent to inclusion of inverters in taps and will not be distinguished as special cases.

The application of n-valued inverters herein are based on inverters related to multiplication by a term defined in $GF(n=2^p)$. This has as a result that such an inverter has as its first element always a 0. For instance in GF(8) a multiplication by 7 may be inversion of a state by the inverter [0 7 1 2 3 4 5 6]. This is a reversible inverter. Another reversible inverter which may not be defined in GF(8) may be the reversible inverter [7 6 5 4 3 2 1 0]. Such inverters may create a greater variety in generators and scramblers of generated signals. In general, one may prefer n-valued inverters being executed in binary logic with binary circuits that are not too complicated and do not take too many clock cycles. The inverter [7 6 5 4 3 2 1 0] is a relative simple inverter as it is the complement of [0 1 2 3 4 5 6 7] which can be created by inverting each bit in a word that represents an 8-state symbol. Inverters can also be implemented by using translation tables.

Figure 19:
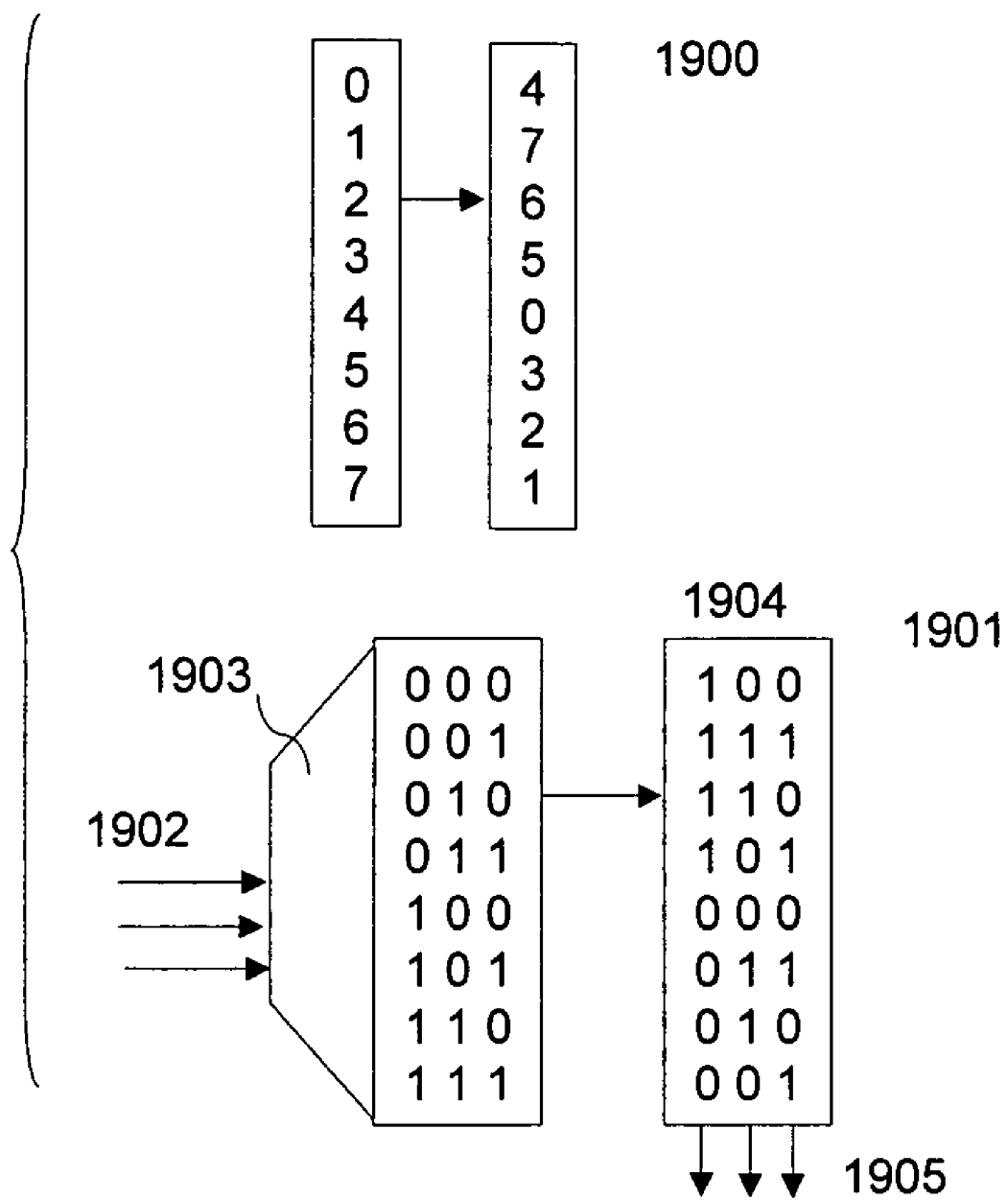
FIG. 19 illustrates a non-zero based reversible inverter.

An example is shown in FIG. 19. Table 1900 shows a direct translation or inversion from [0 1 2 3 4 5 6 7] to [4 7 6 5 0 3 2 1]. This is a self-reversing 8-valued inverter. One may implement such an inverter in binary switching technology using a translation table. This is shown in 1901. The purpose of 1901 is to translate a binary signal of 3 bits into another signal of 3 bits according to table 1900. The initial 3 bits are provided on input 1902 to an address generator 1903. Based on the input bits address translator 1903 will enable an address line in a memory 1904 which has its content arranged according to table 1900. When an address is enabled the memory will provide the content of the memory on outputs 1905. The example shows that when the input 1902 receives [0 1 0] which is equivalent to state 2, the memory will generate [1 1 0] which is equivalent to state 6, which is in accordance with inverter table 1900.

Figure 20:
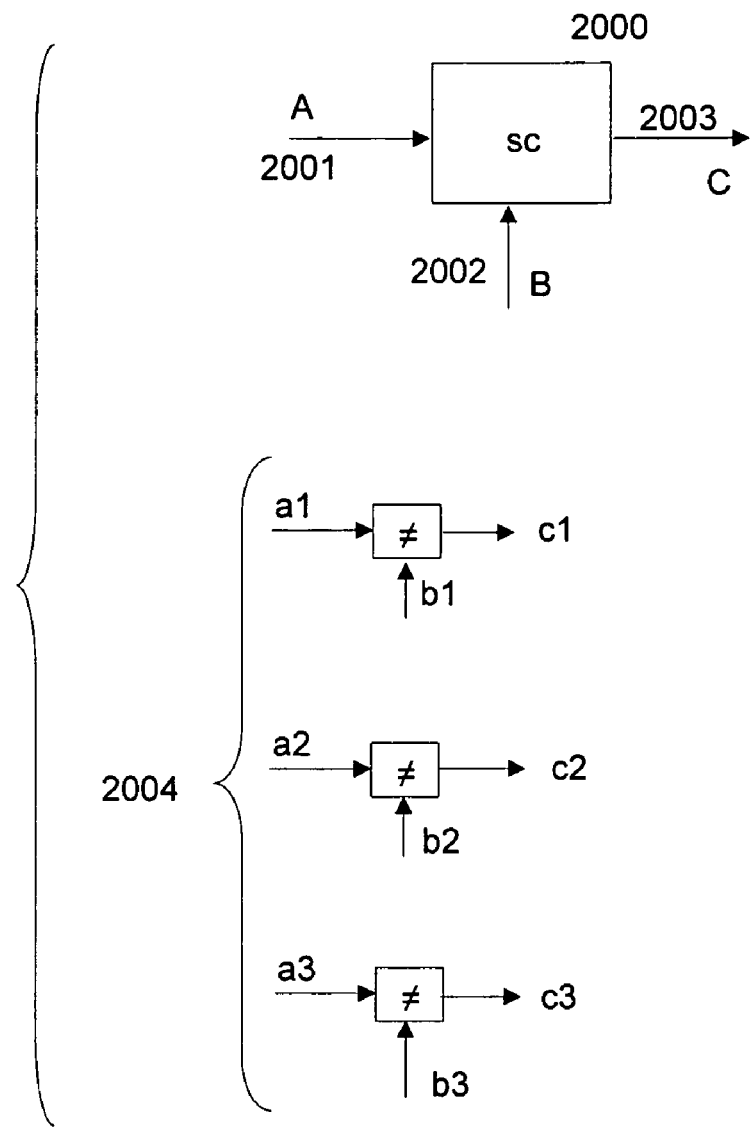
FIGS. 20-21 illustrate an n-state device implemented in binary form.

FIG. 20 shows in diagram how one may implement an addition over $GF(2^p)$ by using XOR functions. As an illustrative example, an 8-valued addition over GF(8) is used. An 8-valued implementation 2000 of the addition function has an input 2001 which is enabled to receive an 8-state signal A, an input 2002 which is enabled to receive an 8-state B and output 2003 which provides an 8-state signal C. It is known that the 8-state addition may be implemented by XOR functions. This is shown in 2004 with three individual XOR functions each with first binary input signal a1, a2 and a3 respectively and with second binary input signal b1, b2 and b3. Each XOR device then outputs binary signal c1, c2 and c3. The relation between the 8-state and binary signals is A=[a1 a2 a3]; B=[b1 b2 b3]; and C=[c1 c2 c3] wherein: (a1≠b1)→c1, (a2≠b2)→c2; (a3≠b3)→c3. The arrow is used as the assignment character. One may represent the circuit of FIG. 20 2000 by the diagram of FIG. 21 2100 as a possible implementation.

Figure 22:
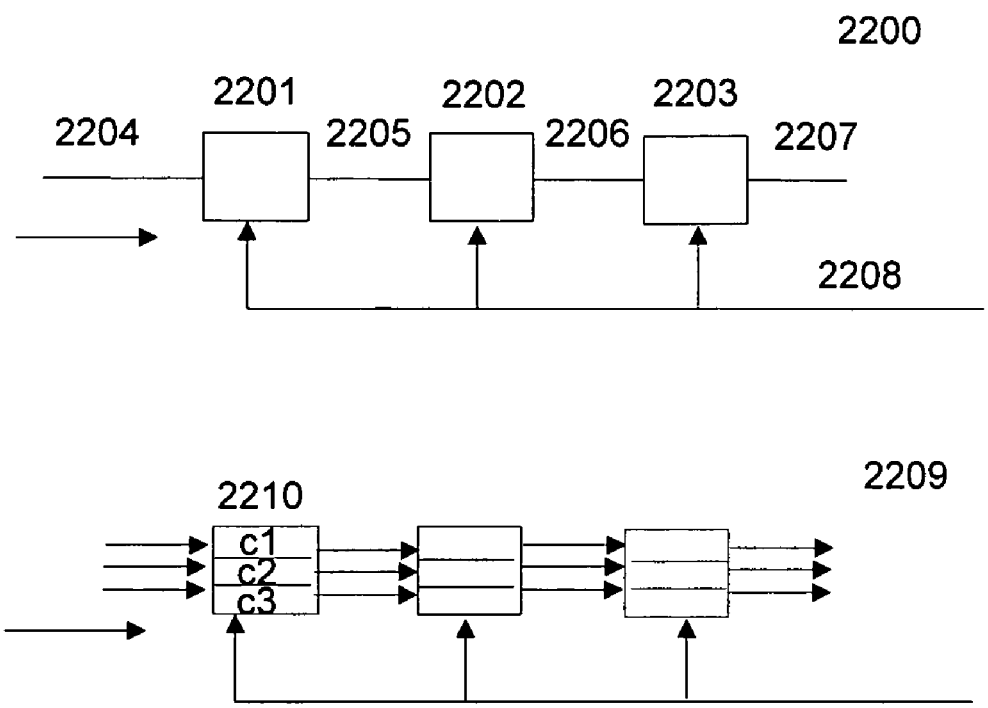
FIG. 22 illustrates an n-state shift register in binary form.

FIG. 22 shows a diagram of an n-state shift register. Herein, 2200 has elements 2201, 2202 and 2203. Each element can store an n-state signal. Element 2201 is inputted with n-state signal 2204 and outputs n-state signal 2205. Signal 2205 is inputted to 2202 which outputs 2206. Signal 2206 is inputted to 2203 which outputs 2207. The register 2200 in general works under a clock signal 2208 which is assumed in all shift registers though not always shown in diagrams to limit unnecessary details. Upon a certain state of the clock signal a shift register element assumes the state that is provided on its input. The input may be the output of the previous shift register. Clearly during shifting the outputs have to remain unchanged until the correct signal is stored in the register elements. After the signals are stored they are then provided on the outputs of the register elements. Under the shift register scheme here provided as an illustrative example the content of the shift register elements shifts from left to right at a clock pulse.

The above example may be implemented with for instance n-valued latches. These latches were disclosed by the inventor in U.S. patent Ser. No. 11/139,835 which was filed on May 27, 2005 and which is incorporated herein by reference. When one applies signals and functions over $GF(n=2^p)$ all n-state signals may be easily represented in binary form. Diagram 2209 shows the binary equivalent of FIG. 22 2200 wherein the n-state signals are replaced by binary signals and register element is a plurality of binary register elements. For instance, if one deals with 8-state signals that are being processed over GF(8) one may represent an 8 state signal by 3 binary signals. A shift register element such as 2210 may then comprise 3 binary shift register elements, which may be parallel. In for instance the element 2210 the bits c1, c2 and c3 are then stored in binary form and they are shifted individually on a clock pulse to the next shift register element.

The n-state implementations either in true n-state implementation or in binary implementation apply to Fibonacci as well as Galois configurations.

It should be pointed out that multi-valued LFSRs in binary configuration over GF(n) may be known, for instance in generating Reed Solomon codewords in an error correcting code. It is pointed out that the symbols generated in those LFSR based coders generate additional symbols that are added to or combined with an input to create a codeword. The generated symbols do not replace the input symbols as required in a scrambler. Corresponding descramblers are not disclosed as part of RS-coders or decoders. In fact an RS decoder has an LFSR which is generally the same as the coder. Herein one takes the received word and compares generated extra symbols or check-symbols with the received check symbols. If there is a difference an error may have occurred.

RS-coders thus are not scramblers, as they are not used in a streaming mode but to generate codewords. An RS code word generally contains more symbols than the original symbols. Furthermore, an RS coder accepts a number of n-state symbols let us say k and generates p check symbols. Accordingly, an RS-coder generates p symbols more than it receives. An RS coder requires word synchronization of words of k n-state symbols, which a scrambler does not. An n-state LFSR scrambler is a streaming coder and does not know words of n-state symbols. N-state LFSR descramblers are believed to be novel. N-state LFSR descramblers over GF($2^p$) implemented in binary logic are also believed to be novel. A scrambler has a one-on-one relationship between a symbol being inputted and a scrambled symbol being outputted. Accordingly, k symbols being inputted for scrambling will be outputted as k scrambled symbols. At each clock pulse a symbol is being inputted and outputted. This is different from an RS coder wherein k symbols may be inputted until for instance a shift register is filled. An RS coder provides all the inputted symbols plus the check symbols and thus provides more symbols than were inputted. An RS code also is a systematic code as it contains the to be coded symbols in a codeword. A scrambler is clearly not a systematic code.

In accordance with a further aspect of the present invention, an n-state LFSR based sequence generator is provided over GF(n=$2^p$). A diagram is shown of a generator 2300 with an LFSR with a 3 n-state shift register 2307, two devices 2301 and 2302 each implementing an addition over GF($2^p$). Furthermore, multipliers 2303, 2304 and 2305 over GF($2^p$) are used in the taps. The multipliers may be any of the multipliers including 0 and 1 over GF($2^p$). A clock signal is as always assumed. A sequence of n-state symbols is generated on 2306. Under some conditions, the sequence may be a pseudo-random sequence of $2^{3p}-1$ n-state symbols. The generator is shown in Fibonacci configuration. A Galois configuration is also possible.

In a further embodiment, the multipliers 2303, 2304 and 2305 may be any n-state reversible inverter.

In a further embodiment the LFSR may be implemented in binary form. This is shown in an illustrative example in FIG. 24. Assume n=8, so that each symbol can be represented by 3 bits. The generator 2400 has three parallel binary data streams. The LFSR applies functions 2401 and 2402 implemented each by 3 XOR functions. The multipliers 2403, 2304 and 2305 may be implemented as was disclosed above or by table translators. The shift register 2407 comprises 3 shift register elements. Each shift register element can hold and shift 3 parallel binary signals. An 8-state signal comprised of three parallel binary signals is provided on 2406. One may convert the three parallel binary signals by a converter 2408 into a true 8-state signal on out 2409. One should be aware that in GF(8) the translation of 3 bits into an 8-state signal should be done according to the GF(8) field and in general may not be the normal D/A conversion.

Figure 23:
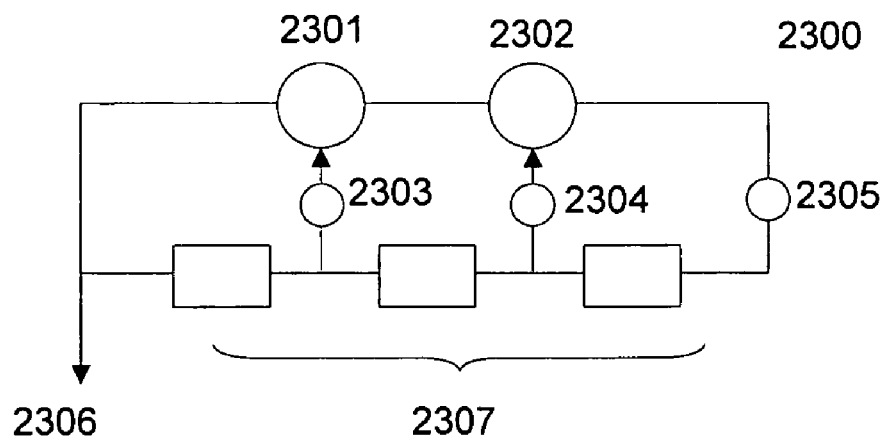
FIG. 23 illustrates an n-state sequence generator.
Figure 24:
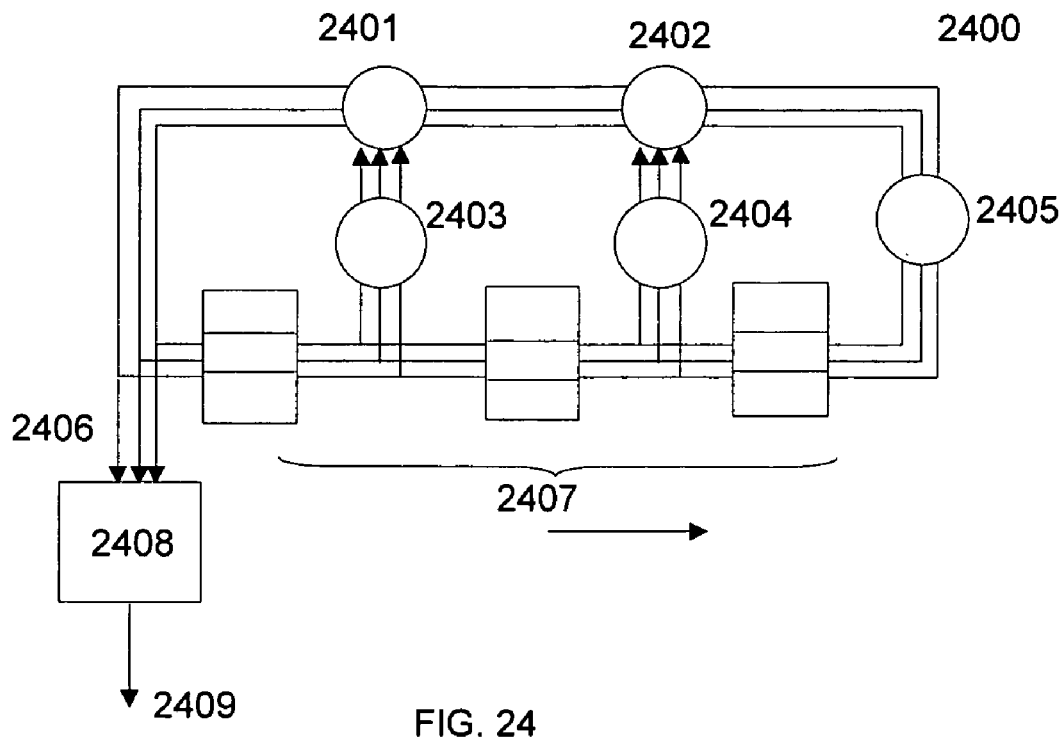
FIGS. 24-25 illustrate 8-state sequence generators in binary form in accordance with an aspect of the present invention.

FIGS. 23 and 24 are provided as illustrative examples. Galois configurations are also contemplated. LFSRs with a different length shift register and with different taps are also contemplated. Other values for n=$2^p$ are also fully contemplated, such as n=256 for instance.

For instance, the generator configuration of FIG. 23 can generate 12 different pseudo-random 4-state sequences if the inverters 2303, 2304 and 2305 can be any of the 4 multipliers over GF(4) (0, 1, 2 and 3). The sequences depend of course on the initial state of the shift register. The 12 4-state PN sequences are not shifted versions of each other. One may also generate PN sequences by using for 2303, 2304 and 2305 any of the 24 reversible n-state inverters. In that case, the configuration of FIG. 23 can generate over 1500 different PN sequences, including the 12 earlier generated PN sequences. These over 1500 4-state sequences are not all unique. Some selections of the inverters will generate a shifted sequence of another sequence which may be generated with a different set of inverters but starting with the same initial state of the shift register.

An 8-valued example will be provided. For instance in one embodiment the inverter 2504 is a multiplier 1 [0 1 2 3 4 5 6 7] and 2505 is [0 2 6 5 7 1 4 3]. In another embodiment 2504 is a multiplier 1 and 2505 is [3 2 7 5 4 6 1 0]. In yet another embodiment 2504 is [3 2 7 5 4 6 1 0] and 2505 is [2 0 5 6 3 4 1 7]. All three configurations can generate a sequence for instance of 511 8-valued symbols in binary form.

Figure 25:
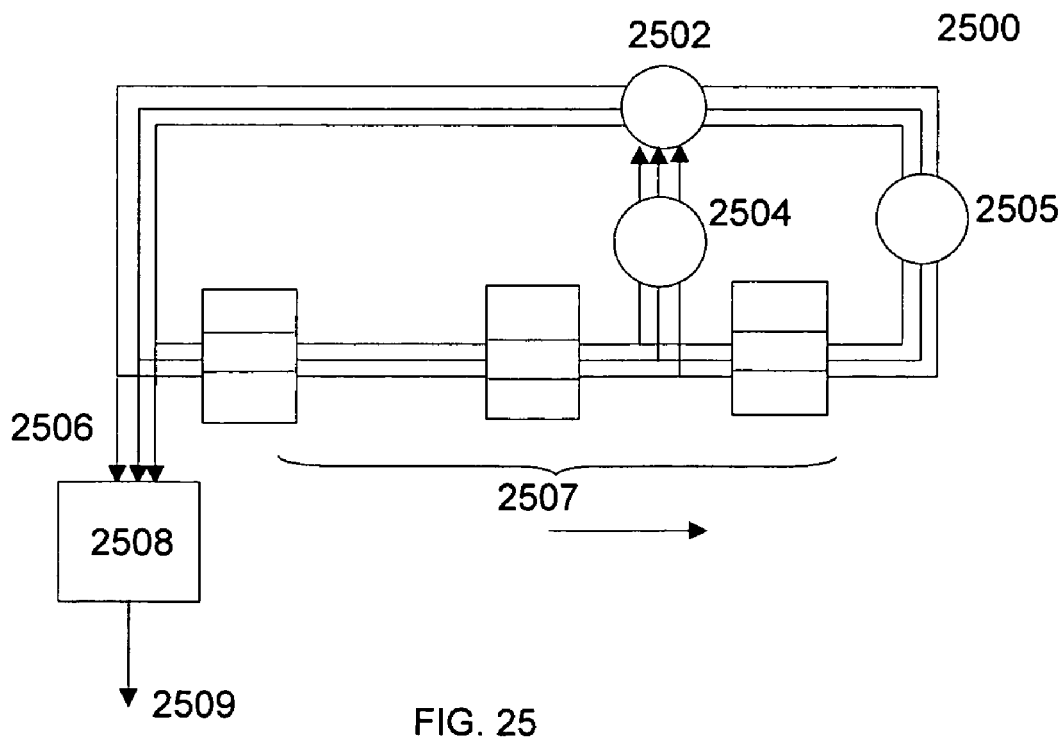

In one embodiment, an n-valued sequence generator is provided using at least one adder over GF($2^p$) with p>2. In a further embodiment, at least one inverter is used not being a multiplier over GF($2^p$) with p>2. For instance, a configuration is used as shown in FIG. 25 with a generator 2500 wherein all devices are implemented in binary logic and the generator is a sequence generator over GF(8) so that all devices have to process 3 bits. The generator 2500 has a shift register 2507 wherein each element can hold 3 bits. Device 2502 is an adder over GF(8) implemented in binary form with 3 XOR devices. Both 2504 and 2505 are 8-valued inverter of which at least one is not a multiplier over GF(8). In that case, an inverter may be implemented by, for instance, a translation table of which an example was provided in FIG. 19. A D/A converter may be applied to generate a sequence of true 8-valued symbols on 2509.

One may apply different ways to calculate an auto-correlation and/or cross-correlation. A correlation for a sequence of discrete elements is usually defined as $$R_i = \sum_{j=0}^{N-1} x_j x_{j+i}$$

wherein j+i is calculated as modulo-N. Basically each element of R is calculated by shifting a sequence and multiplying all symbols of the original sequence with the shifted sequence. In general, a sequence is considered to be a maximum-length sequence if the auto-correlation has one single peak. The cross correlation is a similar expression, though in that case symbols of one sequence are multiplied with symbols of a shifted version of another sequence. In the correlation a symbol is then provided with a value. In the 8-valued case one possibility is to provide a symbol with its corresponding value in modulo-n to calculate a correlation.

Figure 26:
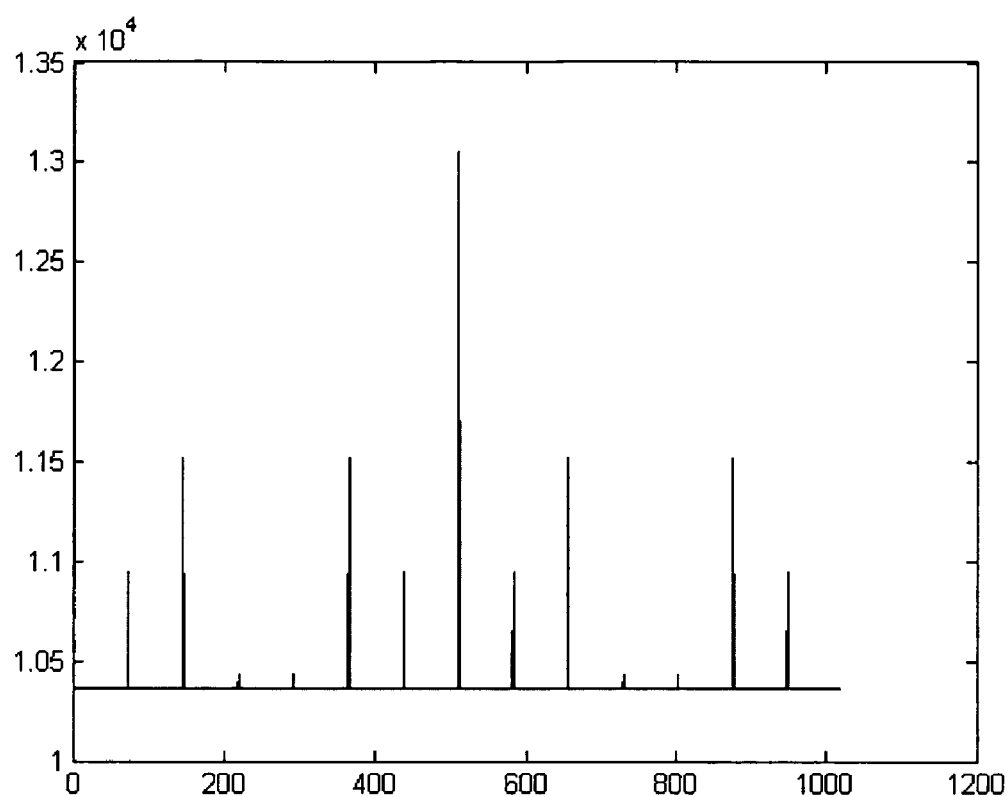
FIGS. 26-27 show a correlation graph.

FIG. 26 shows an auto-correlation graph calculated and plotted in MatLab. Herein the values 1, 2, 3, 4, 5, 6, 7 and 8 are assigned to the symbols of a sequence. The sequence used is the sequence of 511 8-valued symbols generated by the configuration of FIG. 25 with 2505 is [0 2 6 5 7 1 4 3]. The graph is different from a graph of a binary maximum length sequence which usually has two values with one large peak. This graph has several values. Furthermore, the graph has very large values, up to 13,000. This indicates that significant processing takes place for calculating each correlation value, including multiplication and addition. It also shows that the minimum correlation value is about 1000.

Figure 27:
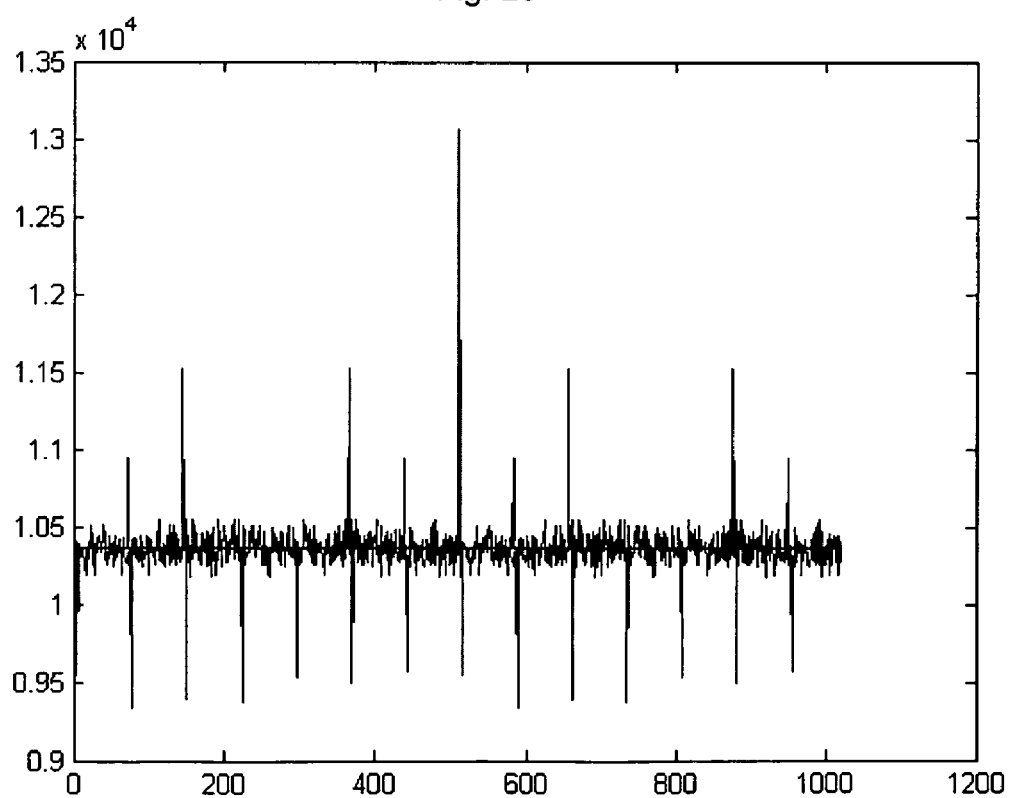

FIG. 27 shows a cross-correlation graph of the earlier sequence with a different 8-valued maximum length sequence generated by the generator of FIG. 25.

Figure 28:
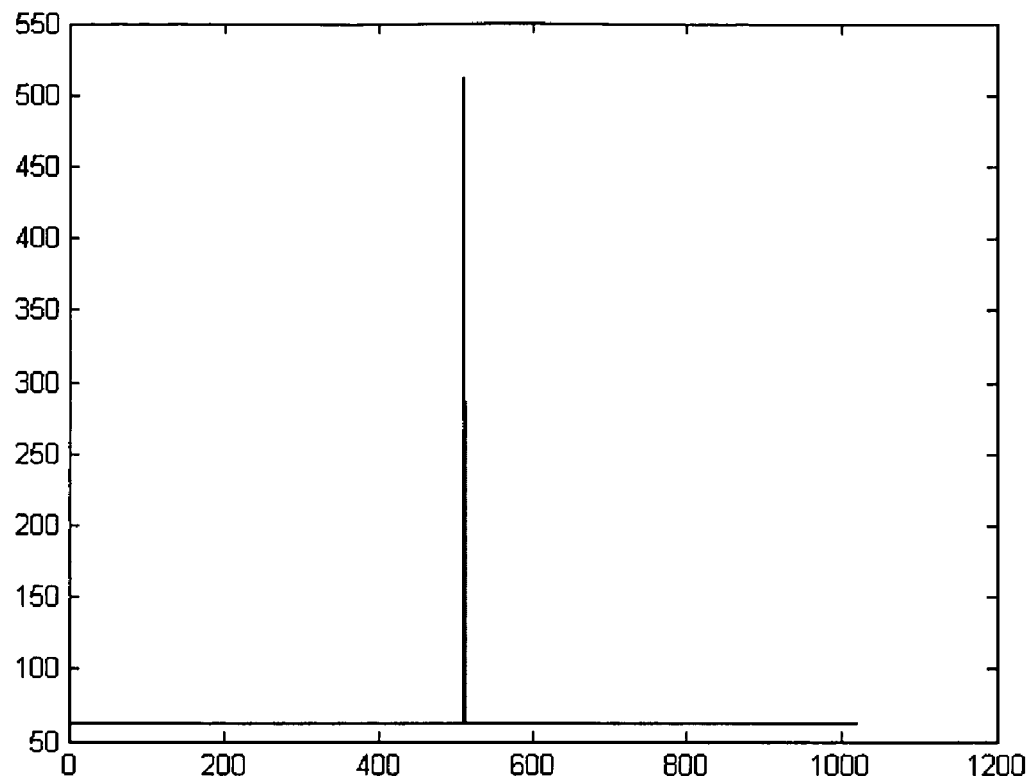
FIGS. 28-30 show correlation graphs in accordance with an aspect of the present invention.
Figure 29:
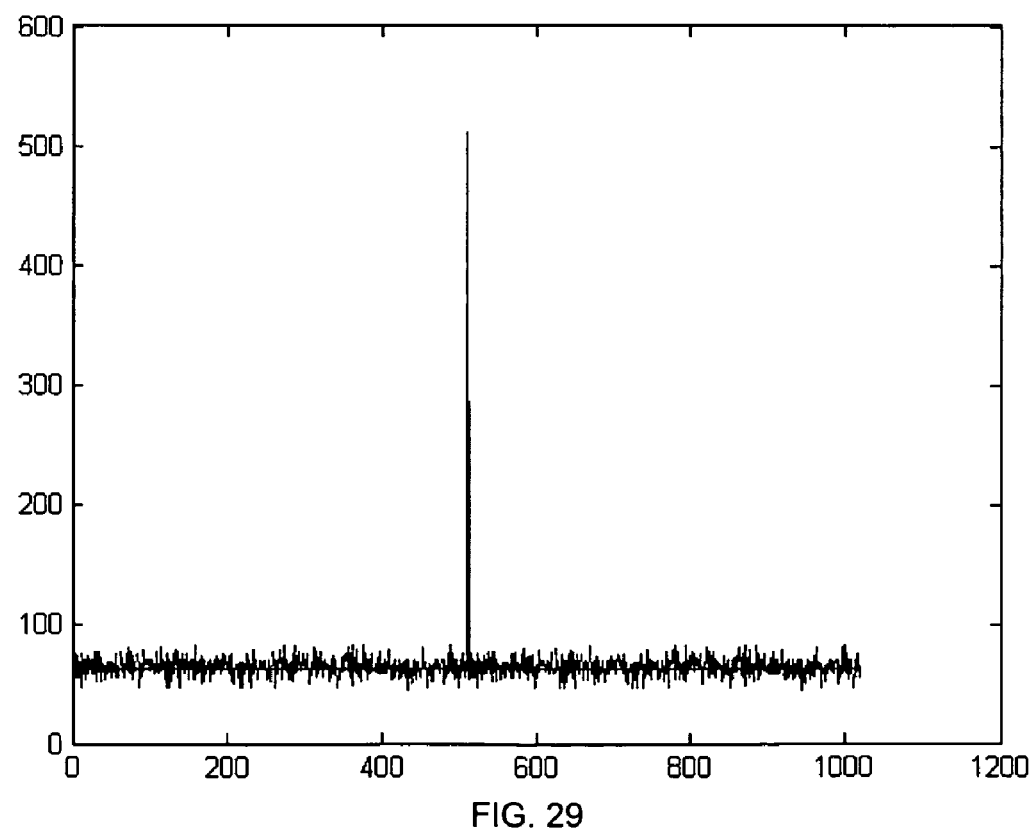
Figure 31:
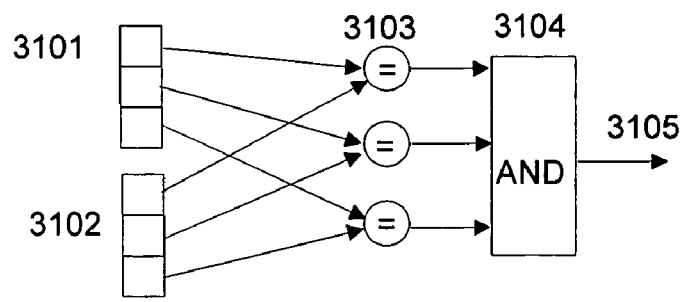
FIG. 31 is a diagram of a device which may be applied in determining a correlation in accordance with an aspect of the present invention.

In accordance with an aspect of the present invention, a different way of calculating correlation and cross-correlation is provided. Instead of calculating a product of two values, two symbols are compared with each other. If they are the same a value such as 1 may be added to a sum. If the symbols are not identical the sum may remain unchanged or a value may be subtracted. FIG. 28 and FIG. 29 show the autocorrelation and cross-correlation combined with the autocorrelation of the earlier example calculated with this rule. It should be clear that comparing symbols in modified binary form is fairly simple. In the 8-valued case one may take 3 bits representing one symbol and compare these with the 3 bits of a different symbol. If they are identical a 1 may be added by a counter. The advantage is that one may compare multiple symbols at the same time. Such an approach in accordance with an aspect of the present invention, is shown in FIG. 31. For instance, 2 8-valued symbols are stored in 2 3-bit memories 3101 and 3102. Their corresponding bits are provided to a compare device of which one 3103 is identified. The outcome is provided to an AND circuit 3104. The outcome of the comparison is provided on output 3105. For instance, a 1 appears on 3105 when the two symbols are identical.

It should be clear that maximum length (ML) sequences of n-state symbols have inherently better auto-correlation graphs than binary maximum lengths sequences of the same length when generated by an LFSR or LFSR like generator. The reason for that is the statistics of the sequence. Maxim length sequences are pseudo random with close to even distribution of symbols of the alphabet they are coded in. This means that in binary ML sequences when sequences are not aligned optimally there is a 50% chance that the symbols are equal and contribute to a correlation value. By the nature of the make-up of n-state ML sequences such a chance is lower and is in fact close to 1/n. That means that in not aligned sequences symbols may minimize the correlation faster than it may contribute to it.

Many operations one n-valued symbols processed in binary fashion are performed on words, each word being p bits when $n=2^p$. In accordance with another aspect of the present invention, processing over GF(n) may also take place on bits in a sequential fashion if that does not distort a result. This means, for instance, that instead of processing in an addition over GF(8) in one clock cycle 3 bits one may process a bit per clock cycle. Clearly this will take more time, however it may save circuitry.

Figure 30:
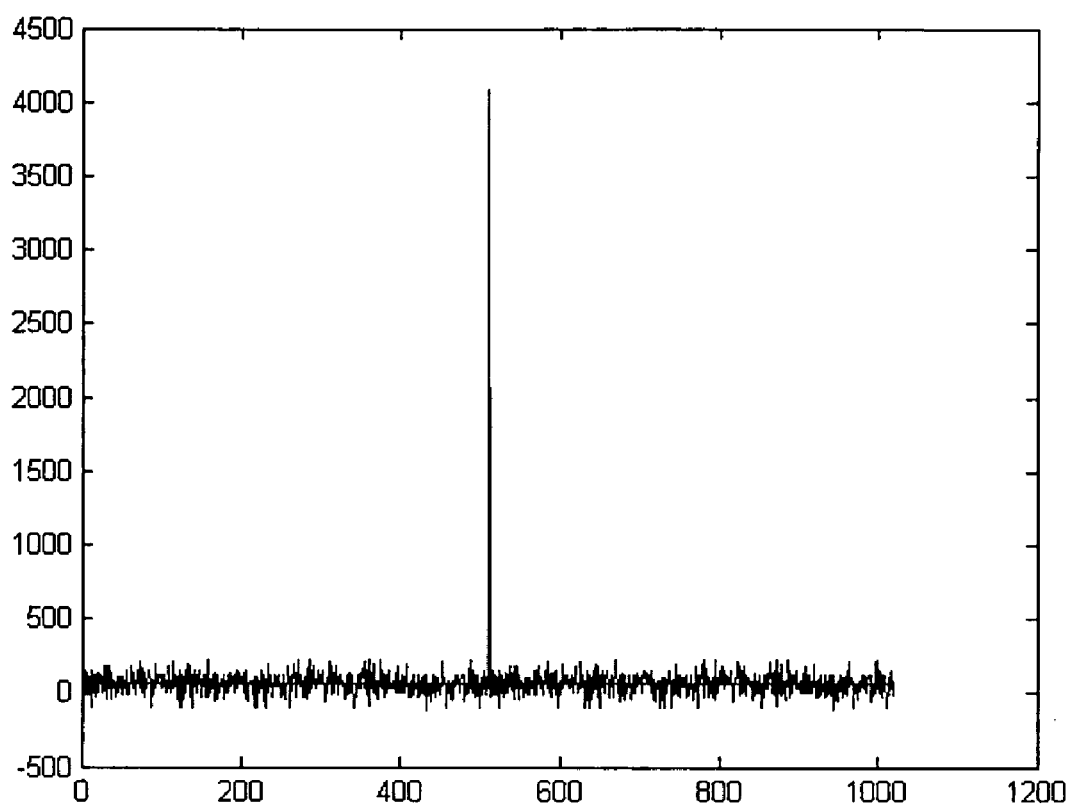

One may adapt the rule for determining a correlation value. For instance one may add 8 when symbols are identical and subtract 1 when symbols are different. A combined auto- and cross-correlation graph of the earlier sequences using this rule is provided in FIG. 30.

It is clear that calculating a correlation value by only an up-counter (and no down-counter) is probably one of the simplest ways to determine a correlation. By the nature of the statistics of binary maximum length sequences the low value in case of a binary maximum length sequence is about half of the top value. The statistics improve with n-valued sequences. For instance, in the binary case a maximum length sequence has a top value of 511 and a minimum value of 255. An 8-valued maximum length sequence has of course also a maximum value of 511, but a minimum value of 63, which is about 511/8. Accordingly the correlation behavior of an 8-valued sequence is better with the same calculation effort.

The method as described in an illustrative example and illustrated in FIGS. 28-31 for calculating a correlation value herein will be called "an n-state binary modified correlation" wherein the correlation may be an auto-correlation or a cross-correlation. It distinguishes itself from a standard n-state correlation calculation by applying adding or subtracting a fixed value rather than a value related to the state of a symbol.

One may generate sequences over $GF(2^p)$, thus not using any other inverters than multipliers over $GF(2^p)$. These multipliers can be implemented in binary form by using the binary circuits as provided above. For instance, the generator of FIG. 25 may generate a maximum length 8-valued sequence of 511 8-valued symbols with inverters 2504 and 2505 both being [0 6 7 1 2 3 4 5].

The above LFSRs applied to sequence generators also apply to scramblers and descramblers over GF(n).

One may also use generators over GF(n) wherein n is not $2^p$. For instance, one may apply the configuration of FIG. 25 for the 7-valued case. The adder is then an adder over GF(7) and the multipliers are also defined over GF(7). This means that both addition and multiplication may be defined as modulo-7. One can generate a maximum length sequence of 342 7-valued symbols with 2504 being [0 4 1 5 2 6 3] and 2505 being [0 5 3 1 6 4 2]. It should be clear that binary coding is not optimal as only 7 of the 8 3 bits possibilities are used if symbols have a straight 7-valued to binary conversion. It should also be clear the implementation of the addition for instance in this case can not be done by processing individual bits with a single XOR function.

Figure 32:
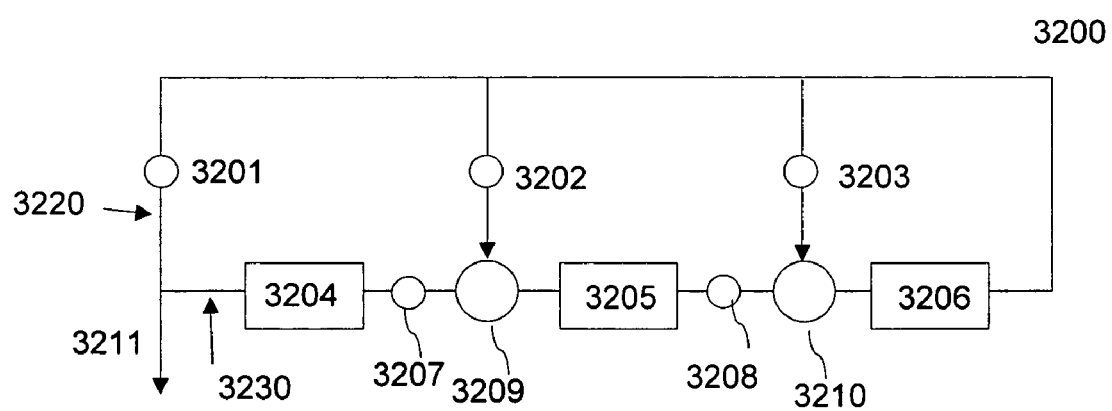
FIG. 32 is a diagram of a sequence generator in accordance with an aspect of the present invention.

As was shown before one may also apply LFSRs in Galois configuration. For the purpose of generating sequences over GF(n) an example of such a generator is provided in FIG. 32. The LFSR 3200 has a shift register with elements 3204, 3205 and 3206. Between the register elements are 2 devices 3209 and 3210 each implementing an adder over GF(n). Furthermore, inverters 3201, 3202, 3203, 3207 and 3208 are also included. Each inverter may be a multiplier over GF(n). For practical purposes inverters 3201, 3207 and 3208 are preferably not the multiplication with 0. A sequence of n-valued symbols may be provided on an output 3211. A clock signal for the LFSR is assumed though not shown in the diagram. In accordance with an aspect of the present invention the sequence generator may be implemented in binary logic. The sequence generator for instance may be a sequence generator over GF(8) so that all circuits and connections as in FIG. 25 may operate on words of 3 bits. One configuration wherein all inverters are multipliers over GF(8) is for: 3207 is [0 3 4 5 6 7 1 2]; 3708 is [0 2 3 4 5 6 7 1]; 3701 is [0 4 5 6 7 1 2 3]; 3702 is [0 7 1 2 3 4 5 6]; and 3203 is [0 5 6 7 1 2 3 4]. This configuration will generate a maximum length sequence of 511 8-valued symbols.

The LFSR may be assigned an output for instance 3220 and an input 3230. One may create a scrambler by inserting a scrambling function, for instance, an adder over GF(8) between the input and the output and input a sequence to be scrambled on the inserted device.

All functions in the 8-valued example can be implemented with earlier disclosed binary circuits. In addition one may use inverters which are not multipliers over GF(8), especially the case wherein state 0 is not inverted to state 0, to generate additional sequences, of which some are maximum length sequences. For instance, the above example with 3203 is the inverter [2 1 0 3 4 5 7 6] will generate an 8-valued maximum length sequence of 511 symbols.

One may use the configuration of FIG. 23 to create a 4-state sequence generator. For instance one may use for 2301 and 2302 an implementation of an adder over GF(4). For 2303 one may use [0 2 3 1] which is a multiplication with 2 over GF(4). For 2304 and 2305 one may use [0 3 1 2] which is a multiplication with 3 over GF(4). The generator of FIG. 23 may generate a 4-state maximum length or pseudo-noise sequence of 63 4-state symbols. One may implement all elements in binary elements wherein the adders can be realized with XOR devices and the multiplications can be implemented with binary combinational circuits all applying words of 2 bits. One may also apply memory based transformations for implementing inverters and/or multipliers.

Figure 33:
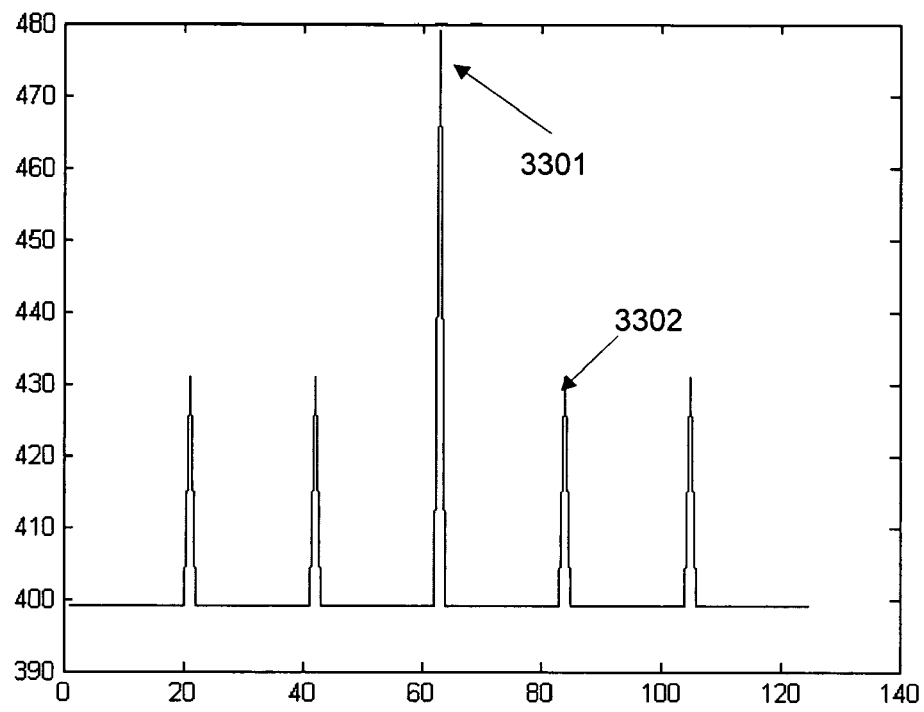
FIGS. 33-34 show correlation graphs.
Figure 34:
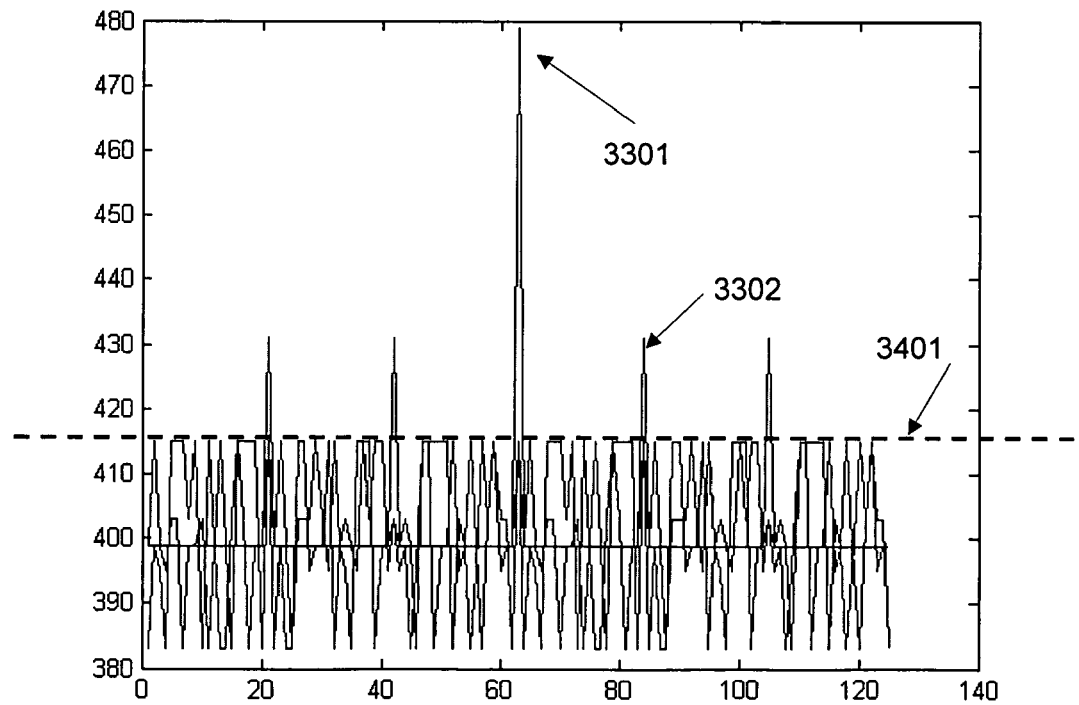

One may generate a sequence of 63 4-state symbols and determine a correlation graph and a cross-correlation graph with a different 63 4-state symbol sequence. One may generate the 4-state sequences with a generator as shown in FIG. 23 which is in Fibonacci configuration. One may also generate sequences by a 3 element LFSR in Galois configuration. FIG. 33 is an auto-correlation graph of a 63 4-state symbol maximum length sequence. The auto-correlation graph is created by using a standard correlation calculation, with assigned values being 1, 2, 3 and 4. This type of standard auto-correlation graph shows a peak 3301 when sequences are aligned. They also show in general one or more sub-peaks 3302. FIG. 34 is a graph of a cross correlation of the sequence of FIG. 33 with other maximum length sequences. The graph shows the peak 3301 and sub-peak 3302 which are not part of the cross correlation. The actual cross correlation is shown below line 3401.

Figure 35:
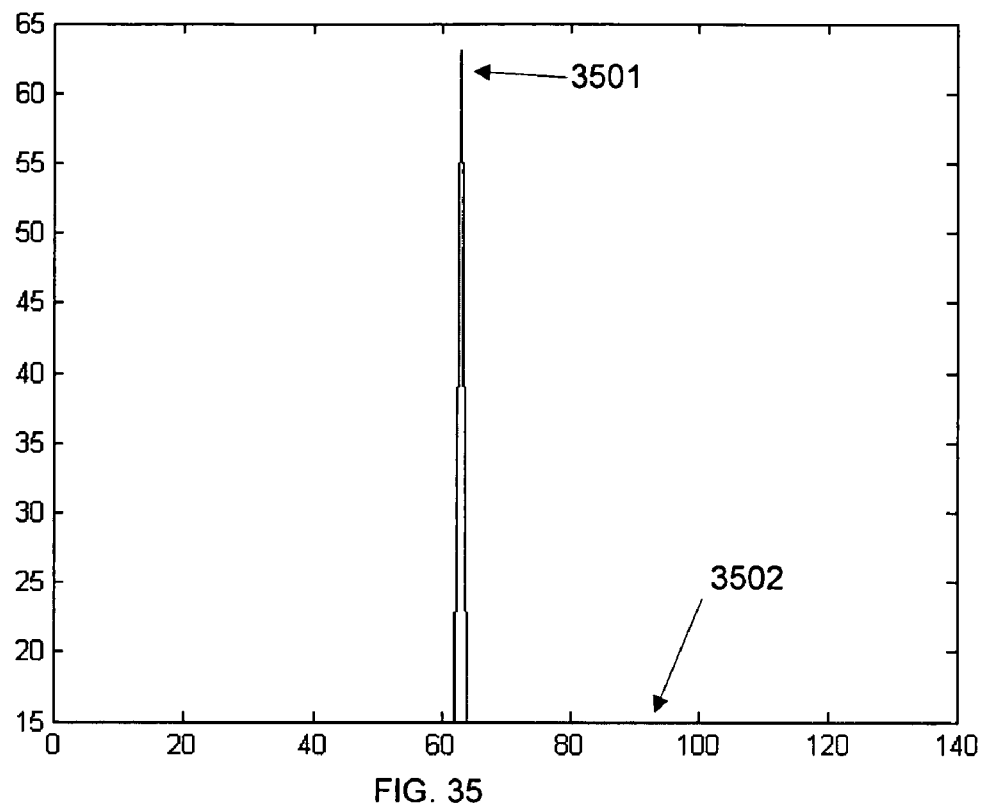
FIGS. 35-36 show correlation graphs in accordance with an aspect of the present invention.

A method for calculating a correlation for sequences of n-state symbols was explained in U.S. patent application Ser. No. 11/042,645, filed on Jan. 25, 2005, which is incorporated herein by reference. The method includes: initiating a sum; adding a fixed value a≧0 when two symbols are identical; and subtracting a fixed value b≧0 when two symbols are different. One may of course also add or subtract a fixed number a<0 when symbols are equal and/or add or subtract a fixed number b<0 when symbols are not equal. For a maximum length sequence this provides an auto-correlation graph as shown in FIG. 35. Such a graph does no longer show sub-peaks. It looks like an auto-correlation graph of a binary sequence. However, the auto-correlation graph as shown in FIG. 35 has a better performance that the binary graph. The graph is formed by adding 1 to a sum when symbols are identical and nothing when symbols are different. This is about the simplest manner of creating a correlation. The peak is of course 63. However, the low value is 15, which is about half it would be in the binary case.

Figure 36:
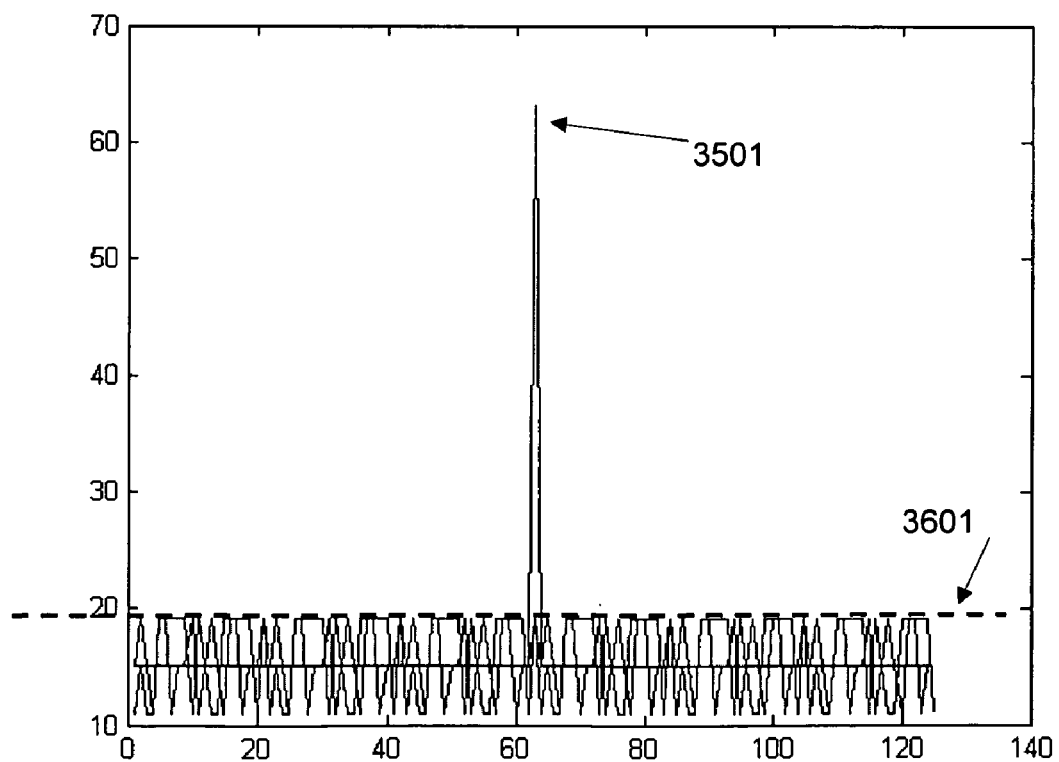

A cross-correlation graph of the sequence of FIG. 35 with other 4-state maximum length sequences is shown in FIG. 36. The peak 3501 of FIG. 35 is also shown and is only provided for reference as it is not part of the cross-correlation. The cross-correlation values are all shown below the line 3601. The method of FIG. 35 and FIG. 36 for calculating a correlation value herein will be called "an n-state binary modified correlation" wherein the correlation may be an auto-correlation or a cross correlation. It distinguished itself from a standard n-state correlation calculation by applying adding or subtracting a fixed value rather than a value related to the state of a symbol.

Figure 37:
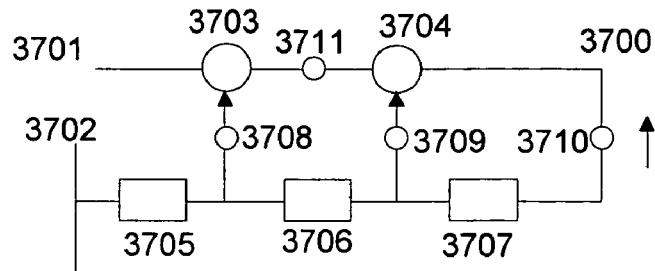
FIGS. 37-46 illustrate LFSRs in accordance with an aspect of the present invention.

FIGS. 37-41 each show a Fibonacci LFSR in a different state or application. FIG. 37 shows a diagram of basic Fibonacci LFSR. Different length shift registers are possible and different multipliers. In FIG. 37 an LFSR 3700 is shown with an n-valued shift register of three n-valued register elements 3705, 3376 and 3707, each enabled to store and shift an n-valued symbol. It may be that n=$2^p$. In that case the LFSR can be implemented in binary form with each device processing or storing p bits. A device may be connected to another device by p parallel binary connections. The LFSR in this illustrative example also has two n-valued or n-state devices 3703 and 3704 implementing an adder over GF(n). The LFSR 3700 also contains 4 n-state inverters 3708, 3709, 3710 and 3711. Other inverters may be applied. An inverter may be a multiplier over GF(n). An inverter may also be a reversible n-state inverter wherein input state 0 will remain state 0 on the output. These inverters will be defined herein as zero-based reversible n-state or n-valued inverters. Multipliers over GF(n) for instance are always zero-based reversible n-state inverters, as state 0 will always remain zero. For instance multiplication with 3 in GF(4) is [0 3 1 2]. For instance in GF(8) a multiplication by 7 may be inversion of a state by the inverter [0 7 1 2 3 4 5 6]. An inverter may also be a reversible n-state inverter wherein input state 0 is inverter into a different state. The n-state LFSR has an output, for instance 3701 and an input for instance 3702. In the binary case with n=$2^p$ the inputs and outputs may be p binary inputs and p binary outputs. The LFSR 3700 may become functionally active when output and input are connected, either directly, including or without a reversible inverter or through a device implementing an adder over GF(n), either with or without a reversible inverter.

Figure 38:
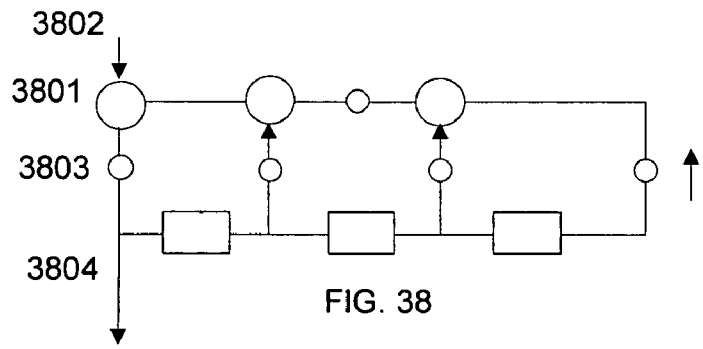

FIG. 38 shows the LFSR of FIG. 37 connected from output 3701 to input 3702 via an n-state logic device 3801 preferably implementing an adder over GF(n) in binary form with two inputs whereof the first input is connected to the output of the LFSR. A second input 3802 of device 3801 is provided with a sequence of n-state symbols, preferably coded in binary words. An output of 3801 may be connected directly to the input 3702 or it may be connected via an inverter 3804 to input 3702 of the LFSR. An output 3804 may provide a scrambled sequence of n-state symbols, which is a scrambled version of the sequence entered on 3802. Accordingly, FIG. 38 shows the n-state LFSR of FIG. 37 being used as part of an n-state scrambler.

Figure 39:
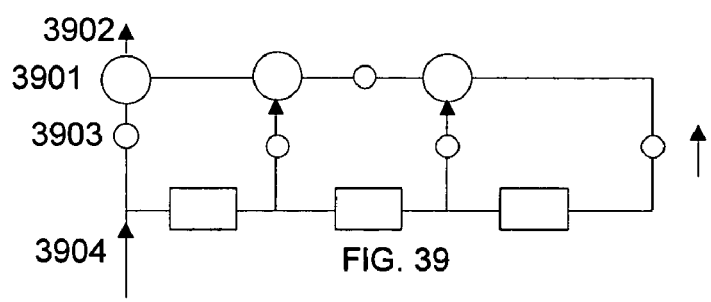

FIG. 39 shows the LFSR of FIG. 37 connected from output 3701 to input 3702 via an n-state logic device 3901 preferably implementing an adder over GF(n) in binary form with two inputs whereof the first input is connected to the output 3701 of the LFSR. A second input of device 3901 is connected to input 3702 of the LFSR, either directly or via an n-state inverter 3903 as shown in FIG. 39. The device 3901 also has an output 3902. A sequence of n-state symbols, preferably coded in binary words in provided on an input 3904 which is connected to the input 3702 of the n-state LFSR. It is also connected to inverter 3903 which may be the n-state identity. Thus, when a sequence of n-state symbols is provided on 3904 then a sequence of n-state symbols will be generated on output 3902. The sequence of n-state symbols provided on 3902 is a descrambled sequence if the input 3904 was inputted with a sequence scrambled by the scrambler of FIG. 38 and outputted on 3804. The descrambler is a self-synchronizing descrambler. For the descrambler to correspond to FIG. 38 the inverter 3903 has to be the reverse of 3703. Accordingly, FIG. 39 shows the n-state LFSR of FIG. 37 being used as part of an n-state descrambler.

Figure 40:
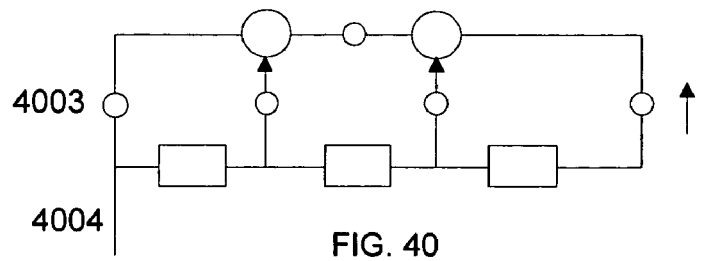

FIG. 40 has output 3701 of the LFSR of FIG. 37 connected to input 3702 via an n-state inverter 4003 which may be an identity. The LFSR also has an output 4004 which will generate a sequence of n-state symbols. By applying the correct inverters a sequence generated on 4004 may be maximum length sequence of n-state symbols. Accordingly, FIG. 40 shows the n-state LFSR of FIG. 37 being used as part of an n-state sequence generator.

Figure 41:
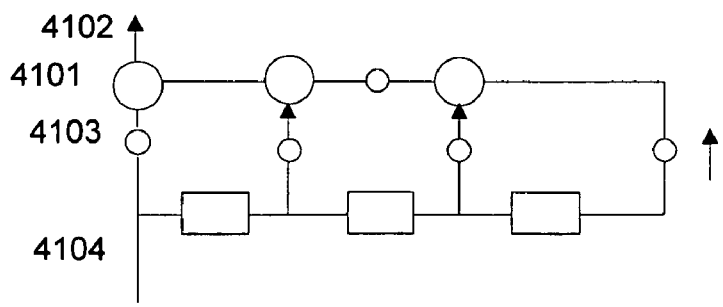

FIG. 41 shows the LFSR of FIG. 37 connected from output 3701 to input 3702 via an n-state logic device 4101 preferably implementing an adder over GF(n) in binary form with two inputs whereof the first input is connected to the output 3701 of the LFSR. A second input of device 4101 is connected to input 3702 of the LFSR, either directly or via an n-state inverter 4103 as shown in FIG. 41. The device 4101 also has an output 4102. A sequence of n-state symbols, preferably coded in binary words and generated by the circuit of FIG. 40 is provided on an input 4104 which is connected to the input 3702 of the n-state LFSR. It is also connected to inverter 4103 which may be the n-state identity. Thus when a correct sequence of n-state symbols is provided on 4104 then a sequence of n-state symbols all being 0 will be generated on output 4102. If not a correct sequence is provided the output sequence will not all be 0. Accordingly, FIG. 41 shows a detector of maximum length sequence of n-state symbols. When the initial state of the shift register is not correct but the input sequence is, then after flushing the shift register the detector will start generating all 0s. One may modify the function for detection 4101 by providing additional non-zero-based inverters at the inputs of 4101.

Figure 42:
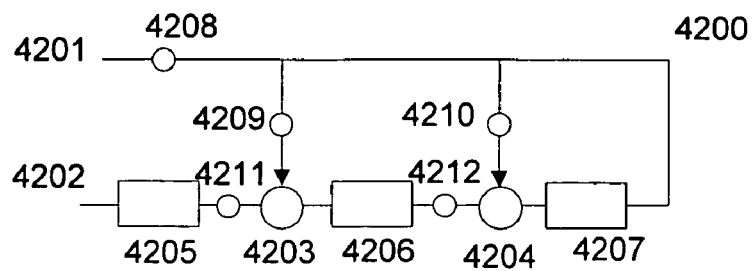

FIG. 42 shows an n-valued LFSR in Galois configuration. It contains devices implementing n-state logic functions 4203 and 4204 which are preferably adders over $GF(n=2^p)$. It furthermore contains shift register elements 4205, 4206 and 4207, indicated by the larger circles. It also contains n-valued inverters 4208, 4209, 4210, 4211 and 4212 which may be multipliers over $GF(n=2^p)$ and are indicated by smaller circles. The inverters may also be zero-based n-state reversible inverters including identity or non-zero-based n-state reversible inverters. The n-state LFSR has an output 4201 and an input 4202. Another input output combination may be selected. An n-state Galois LFSR as shown in FIG. 42 may become functionally active when input and output are connected, either directly, or by including a device which may be an inverter and or a device implementing an adder over GF(n).

Figure 43:
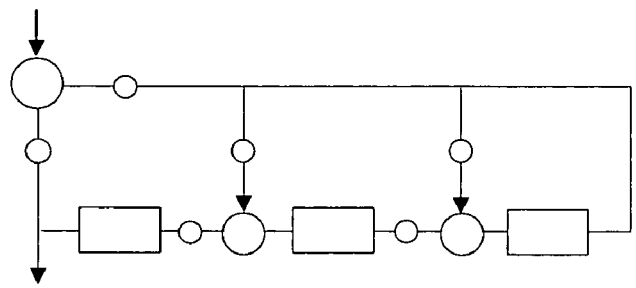
Figure 44:
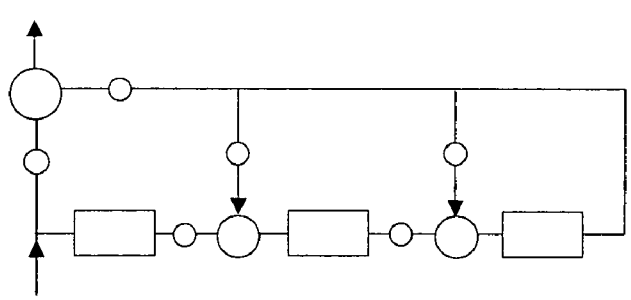
Figure 45:
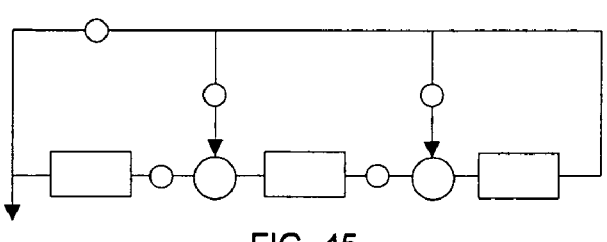
Figure 46:
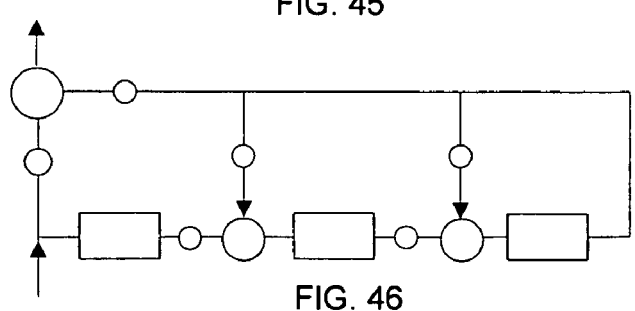

Noting that a large circle represents an adder over GF(n) and a small circle represents an inverter, one can easily see that: FIG. 43 is a diagram of a scrambler applying an LFSR in Galois configuration; FIG. 44 is a diagram of a descrambler applying an LFSR in Galois configuration; FIG. 45 is a diagram of a sequence generator applying an LFSR in Galois configuration; and FIG. 46 is a diagram of an n-state maximum length sequence detector applying an LFSR in Galois configuration;

The detector in Galois configuration as shown in FIG. 46 is not self-synchronizing and the initial state should correspond with the initial state of the corresponding sequence generator.

The term scrambler and descrambler may be used in different contexts. A scrambler herein means the one-on-one transforming of symbols of a to be scrambled sequence of symbols into the same number of scrambled symbols in a scrambled sequence. A logic based scrambler applies at least one operation or a logic device that can be expressed as a logic or n-state switching operation. A sequence generator herein is an autonomous operation wherein a sequence of symbols is generated by processing of internal states of the generator. Unlike the scrambler and descrambler a sequence generator does not require an external sequence to be processed, with exception of external signals like clock signals. A sequence detector is somewhat like a descrambler as it is inputted with a sequence of symbols. However, the purpose of the detector is to generate a fixed pattern of symbols, such as all 1s for instance, or a pattern like 1 2 3 1 2 3 1 2 3 for instance when a certain sequence is detected. Such a detection pattern may generally not reflect the symbols of the detected sequence, but reflects the diagonal of the detecting logic function with identical symbols on two inputs.

The circuits herein are illustrated by application of LFSRs. It was shown by the inventor that one may use for instance addressable memories instead of LFSRs to create binary and n-state scramblers, descramblers, sequence generators and sequence detectors. One may apply binary addressable memories acting upon binary words, a binary word representing an n-state symbol. The processing of the n-state symbols may take place over GF(n) applying binary circuits. The LFSR alternatives are described in U.S. patent application Ser. No. 11/427,498, filed on Jun. 29, 2006, U.S. patent application Ser. No. 11/534,837, filed on Sep. 25, 2006, and U.S. patent application Ser. No. 11/555,730, filed on Nov. 2, 2006, which are all three incorporated herein by reference in their entirety.

It was shown herein and elsewhere that n-state symbols with $n=2^p$ may be represented by words of p bits. The same applies when $n<2^p$. By processing the n-state symbols with operations defined over $GF(n=2^p)$, for instance, by an adder over GF(n) one may process a word by processing each individual bit or pair of corresponding bits by a binary function such as a XOR function. It is to be understood that p in case of $n=2^p$ is the minimum size of a word. One may increase the number of bits to p+q wherein q provides a redundancy. Accordingly, when stating that $n=2^p$ and representing an n-state symbol by p bits and processing an n-state symbol as a word of p bits should be read as: representing an n-state symbol by at least p bits and processing a word of at least p bits unless it is specifically indicated that redundancy is excluded.

For illustrative purposes, additions over GF(4) and GF(8) are provided. It is an aspect of the present invention to provide scramblers, descramblers, sequence generators, sequence detectors, LFSRs and methods for calculating a correlation as "an n-state binary modified correlation", and inverters as non-zero-based n-state reversible inverters and zero-based n-state reversible inverters for n>8. How to create additions and multiplications for $GF(n=2^p)$ including p>3 is known and is explained for instance in the White Paper WHP 031 entitled "Reed Solomon error correction" by C. K. P. Clarke and published in July 2002 by the British Broadcasting Corporation and made available on the World Wide Web. Accordingly, operations such as multiplication and addition over GF(n) are fully enabled.

The methods and apparatus disclosed herein as aspects of the present invention may be applied in a whole range of applications. They may, for instance, be applied in a communication system wherein a series of bits may be coded as n-valued symbols and may be modulated accordingly. As a further aspect of the present invention, these symbols may be scrambled in accordance with an n-state scrambler in binary form. For instance in wireless digital communication and digital video signals one may use a modulation technique that provides a carrier with a phase as an n-state signal or as part of an n-state signal. One may also use a modulation technique wherein an amplitude indicates a state or part of a state. One may also use a frequency to indicate a state or part of a state. QAM, QAM-4, QAM-16, QAM-64, QAM-128, QAM-256, QAM-512, QAM-1024, QAM-2048 and QAM-4096 are examples wherein amplitude and a phase may indicate a state. QPSK, MSK, are other examples of modulation techniques. PAM, PDM, PPM, FM, MSK, DSPK, 4-PSK, 8-PSK, FSK, DMT, OFDM, OFDMA and CDMA are also known as modulation techniques to create n-state signals. Logic scrambling and descrambling can be applied to any of these technologies. Logic scrambling is the scrambling of symbols before modulation. Logic descrambling is the descrambling of symbols after demodulation. Physical scrambling is the scrambling of the modulated signal. In QAM this may be the addition of a phase to a modulated signal. The addition is usually a real addition or a modulo-n addition. In accordance with an aspect of the present invention, physical scrambling is provided by modifying a phase by applying at least one device not implementing a modulo-n adder.

In accordance with an aspect of the present invention, the scrambling and descrambling methods and apparatus as provided herein in accordance with one or more aspects of the present invention can be applied to any communication system that applies a modulation technique that can create n-state symbols having one of 3 or more states and/or that applies a modulation technique that can create a symbol having one of $n=2^p$ states with $p>1$.

In accordance with a further aspect of the present invention, one may generate a sequence of n-state symbols which may be represented in binary form and for instance as at least p bits when $n=2^p$. One may then modulate a sequence of bits, which may comprise a multiple of p bits in for instance a QAM-M signal, wherein $M=2^q$ and q is a multiple of p. For instance, one may code a sequence of 511 bits as a plurality of QAM-4 signals. It may be required to include a null signal as the number of bits does not match exactly. A null signal or symbol or bit or series of bits may be recognized as not being part of a dedicated information carrying signal. A null symbol may be applied to indicate a start or a stop of a sequence. So a ML sequence of 511 bits may be coded as 256 QAM-4 symbols. A null symbol may be used to complete the appropriate number of symbols. However, one may also generate a ML sequence of 255 4-state symbols. This may generate about the same number of bits and QAM-4 symbols. Rather than analyzing the recovered binary sequence with a binary correlation one may analyze the sequence as a 4-state symbol sequence by applying an n-state binary modified correlation as was provided herein as an aspect of the present invention. In a further example, one may generate a 4095 ML sequence of bits. This may require for QAM-4096 transmission a single symbol. One may also generate a 1024 8-state symbol ML. This requires 3×1024=3072 bits, which may also be transmitted in a single QAM-4096 symbol. In accordance with a further aspect of the present invention one may thus generate a ML sequence of t bits wherein each set of p bits represents an n-state symbol and wherein one or more set of p bits may be modulated to a QAM-$2^{mp}$ symbol wherein $p>1$ and $m \geq 1$.

There are several reasons why a scrambler may be used. One may use a scrambler for breaking up one or more patterns of a plurality of n-state symbols. For instance, a pattern of all 0s may be undesirable. The same may apply to other patterns. Another reason may be to provide increased security of a signal. Other reasons may apply also. One reason to use n-state scramblers and descramblers in binary form as here provided is that they are self-contained. That is, one does not to have to generate a separate sequence to scramble against.

Figure 7:
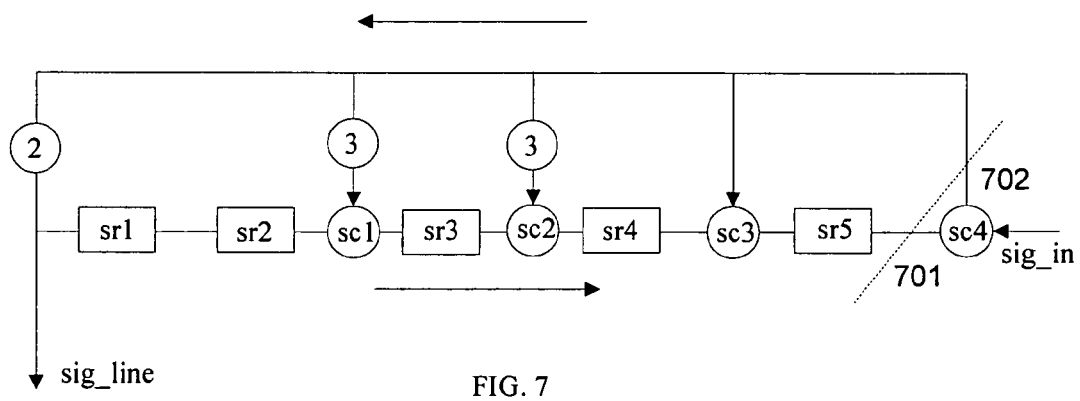
FIG. 7 is a diagram showing another n-valued Linear Feedback Shift Register (LFSR) based scrambler in accordance with an aspect of the present invention.
Figure 8:
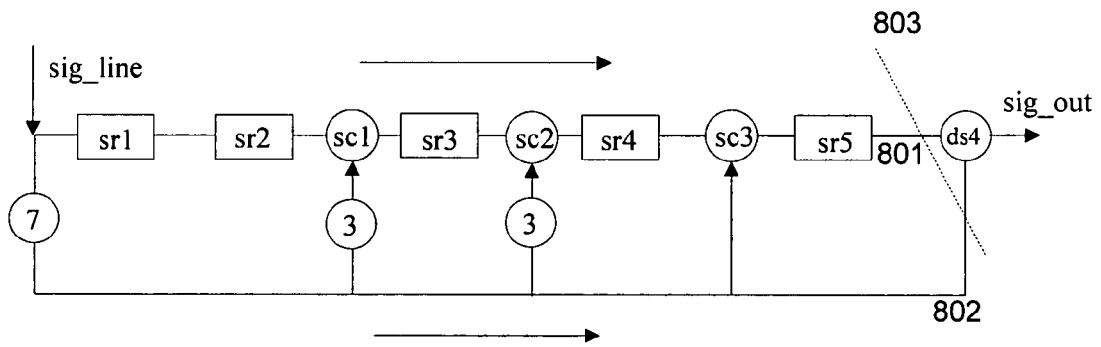
FIG. 8 is a diagram showing another n-valued Linear Feedback Shift Register (LFSR) based descrambler in accordance with an aspect of the present invention.

An additional advantage of the descrambler in Fibonacci configuration is self synchronizing. The same applies to the Galois configuration of which an example is shown in FIGS. 7 and 8. Herein the descrambler of FIG. 8 is self-synchronizing. For a binary implementation over GF($n=2^p$) the functions sc1, sc2, sc3, sc4 and ds4 as shown in FIGS. 7 and 8 may be adders over GF($n=2^p$). The multipliers may be multipliers over GF($n=2^p$) or any other multiplier that can be implemented in binary form or with a binary transformation table.

The LFSR of scrambler and descrambler as shown in FIGS. 7 and 8 are of course in Galois configuration. However, their input 801 and output 802 along cut lines 803 is in Forward configuration rather than in Feedback. The Galois LFSR for the descrambler herein is therefore called a Galois LFSR in Forward configuration. The concept of this type of descrambler for any n-state is further explained in U.S. patent application Ser. No. 11/696,261, filed on Apr. 4, 2007, which is incorporated herein by reference in its entirety.

In accordance with a further aspect of the present invention, a scrambler and descrambler applying an implementation of an adder over GF($2^p$) and a sequence generator over GF($2^p$) are provided. Phase scramblers may be used in phase scrambling in for instance QAM-4. Herein, a pseudo-random phase may be added to an existing phase of a symbol representation for instance. One may provide better scrambling by using an adder over GF($2^p$) and multipliers over GF($2^p$) and other inverters which may be implemented in a binary fashion.

Figure 47:
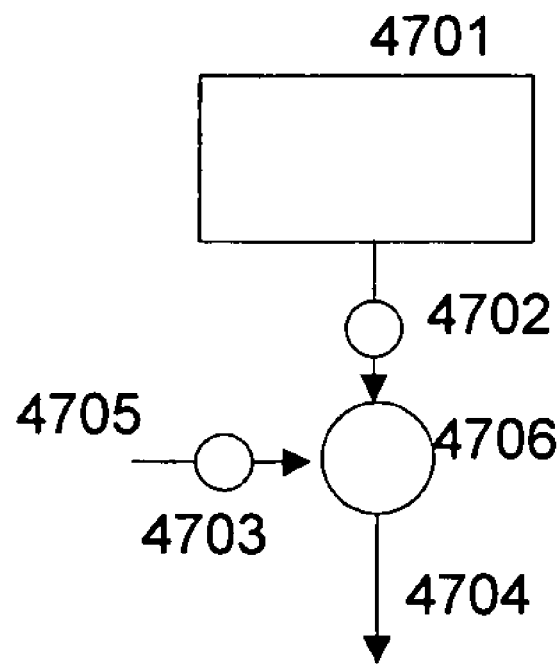
FIG. 47 illustrates a scrambler in accordance with an aspect of the present invention.

A diagram of an illustrative example is provided in FIG. 47. A sequence of n-state symbols in binary form is generated by a sequence generator 4701. Each n-state symbol is represented and processed as at least p bits. An n-state symbol which may be provided as a binary word may be inverted by an n-state inverter 4702 which may include identity. The inverted symbols are provided on an input to a device 4706 implementing an n-state logic function which may be implemented in binary form and may be an adder over GF($2^p$). A to be scrambled sequence of n-state symbols, which may be represented as binary words is provided on an input 4705 and may be presented first to an n-state inverter 4703 before being entered into the device 4706. A sequence of scrambled n-state symbols which may be represented in binary form is provided on output 4704. The sequence of scrambled symbols may then be provided to a modulator wherein the symbols are entered and a modulated symbol for instance in a QAM format is generated. In this approach before modulation the symbol in a modulated form did not exist. This is fundamentally different from known approaches such as disclosed for instance in U.S. Pat. No. 6,961,369 to Tzannes and issued on Nov. 1, 2005 which is incorporated herein by reference, wherein by way of modulation a phase is added to a signal with a phase. One may call this physical or modulated scrambling. Scrambling and descrambling as disclosed herein takes place in logical form before a symbol is created in its modulated form and thus is called logical scrambling or n-state logic scrambling.

Figure 48:
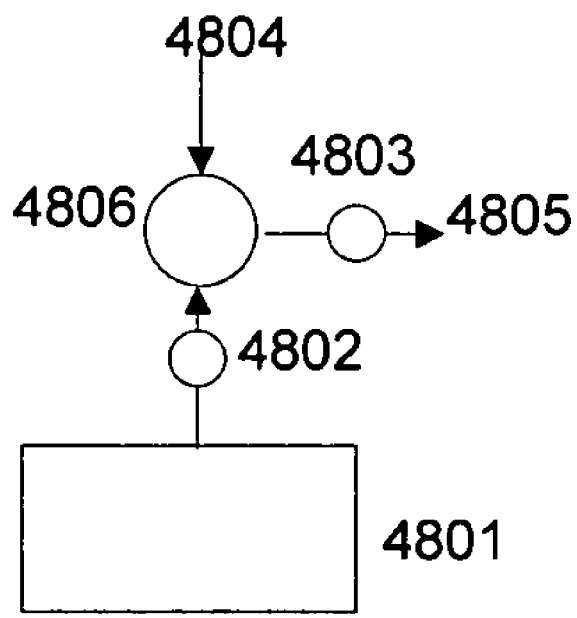
FIG. 48 illustrates a descrambler in accordance with an aspect of the present invention.

Logic or n-state logical descrambling is illustrated by diagram in FIG. 48. An incoming scrambled and modulated n-state signal to be descrambled may be demodulated and provided for instance in binary form on an input 4804 to a device implementing an n-state descrambling function which may be implemented in binary form and may be an adder over GF($2^p$). A sequence of n-state symbols in binary form is generated by a sequence generator 4801. Each n-state symbol is represented and processed as at least p bits. An n-state symbol which may be provided as a binary word may be inverted by an n-state inverter 4802 which may include identity. The inverted symbols are provided on an input to the device 4806. The device 4806 may output a sequence to an n-state inverter 4803 which may output the correctly descrambled sequence of n-state symbols on output 4805. One should take care of selecting the correct inverters in the descrambler to reverse the inverters in the scrambler. One may insert an n-state inverter in the output 4704 of the scrambler in FIG. 47. In that case for correct descrambling one should insert a corresponding inverter in the input 4804 of the descrambler of FIG. 48. An advantage of the scrambler/descrambler of FIGS. 47-48 is that one may influence the statistical make-up of the scrambled signal. A disadvantage may be that herein one has to provide synchronization of the sequence generators in the scrambler and descrambler.

Scrambling may be an important means to control peak-to-average power-ratio (PAR) in a set of modulated symbols. Accordingly, the scramblers provided herein as one or aspects of the present invention may be applied to adjust the PAR in a modulated signal.

The known art expresses addition over $GF(n=2^p)$ as an execution of individual bits of a word with an XOR function. This may be because the XOR function is equivalent to modulo-2 addition which exists of course over GF(2). One may then easily create a binary extension field $GF(2^p)$ by the processing of words of bits by processing of individual sets of corresponding bits in 2 words by the XOR function, which may lead to a truth table of $GF(2^p)$. A fundamental requirement for such an extension scheme to work may be explained in terms of Galois or Finite Field Theory. From an m-state switching point of view one may also say that an extension of a 2-input/single output m-state switching function may be created to operate on a word of p m-state symbols, wherein a word of p m-state symbols represents an $m^p$ state symbol if the truth table of the m-state function is a reversible m-state function. This applies certainly to the binary XOR function. However, it also applies to the binary EQUALITY function. It is known from the theory if adequate equivalents that all binary logic functions may be implemented in binary NAND functions and inverters.

It is known in the art such as for instance described in Gerrit Blaauw "Digital System Implementation", Prentice Hall, 1976 Englewood Cliff, N.J. pages 351-352 that the XOR (or '≠') and EQUALITY (or '=') functions each requires the same number of NANDs (3) and inverters (2). An EQUALITY function may also be created from an XOR by placing for instance an inverter at the output of the XOR. An XOR function may also be created from an EQUALITY function by placing for instance an inverter at the output of the EQUALITY. One may create in accordance with a further aspect of the present invention an $n=2^p$ state function which may be implemented in binary form, wherein an $n=2^p$ symbol is represented by at least p bits and 2 words of at least p bits may be processed by processing the individually corresponding bits by a device implementing a binary EQUALITY or '=' function.

The truth tables of the binary '=' function and of the 4-state and 8-state extension are provided in the following tables.

| = | 0 | 1 |
|---|---|---|
| 0 | 1 | 0 |
| 1 | 0 | 1 |

| $GF(=^2)$ | 0 | 1 | 2 | 3 |
|---|---|---|---|---|
| 0 | 3 | 2 | 1 | 0 |
| 1 | 2 | 3 | 0 | 1 |
| 2 | 1 | 0 | 3 | 1 |
| 3 | 0 | 1 | 1 | 3 |

| c | $GF(=^3)$ | b 0 | 1 | 2 | 3 | 4 | 5 | 6 | 7 |
|---|---|---|---|---|---|---|---|---|---|
| a | 0 | 7 | 6 | 5 | 4 | 3 | 2 | 1 | 0 |
|   | 1 | 6 | 7 | 4 | 5 | 2 | 3 | 0 | 1 |
|   | 2 | 5 | 4 | 7 | 6 | 1 | 0 | 3 | 2 |
|   | 3 | 4 | 5 | 6 | 7 | 0 | 1 | 2 | 3 |
|   | 4 | 3 | 2 | 1 | 0 | 7 | 6 | 5 | 4 |
|   | 5 | 2 | 3 | 0 | 1 | 6 | 7 | 4 | 5 |
|   | 6 | 1 | 0 | 3 | 2 | 5 | 4 | 7 | 6 |
|   | 7 | 0 | 1 | 2 | 3 | 4 | 5 | 6 | 7 |

One may thus, in accordance with an aspect of the present invention, create a scrambler, descrambler, sequence generator and sequence detector for n-state symbols wherein an n-state symbol is represented by at least p bits by using a device that implements either an adder over $GF(2^p)$ or a device that implements the function over $GF(=^p)$. $GF(=^p)$ is used herein to indicate the function that can be implemented by using at least two binary '=' functions as was shown above.

As an example one may create a pseudo-random 4-state symbol sequence of maximum length of 63 4-state symbols by a 4-state sequence generator as shown in FIG. 23 wherein 2301 and 2302 are devices implementing $GF(=^2)$ and the multipliers 2303, 2304 and 2305 are multipliers over GF(4) being a factor 2, 1 and 3. One may also make 2302 implement an adder over GF(4) 2301 implements $GF(=^2)$ and the inverters implement multipliers 1, 1, 2. One may apply multipliers over GF(4) implemented in binary form as inverters. One may also apply zero-based 4-state reversible inverters or one may apply any 4-state reversible inverter in binary form in a 4-state sequence generator. A correlation graph for such a sequence may be determined using the above provided "modified binary n-state correlation" method. In accordance with a further aspect of the present invention one may create a scrambler, descrambler, sequence generator and/or sequence detector for 4-state symbols wherein an n-state symbol is represented by at least 2 bits by using at least one device that implements an adder over $GF(2^2)$ and at least one device that implements the function over $GF(=^2)$. $GF(=^2)$ is used herein to indicate the function that can be implemented by using at least two binary '=' functions as was shown above. One can easily check the correct working of such a scrambler, descrambler, sequence generator and/or sequence detector.

One may also easily check the generation of a maximum length 511 8-state symbol sequence by using a device implementing with 3 or more '=' functions the 8-state function $GF(=^3)$. One may determine a correlation graph by using the "n-state binary modified correlation" method. One may use as inverters multipliers over GF(8), zero-based 8-state inverters or any reversible 8-state inverter that may be implemented in binary form. One may easily check that the above and other 8-state LFSRs applying at least one function $GF(=^3)$ may be applied to create at least one 8-state scrambler, descrambler, sequence generator and/or sequence detector in binary form.

In accordance with a further aspect of the present invention, a plurality of n-state with $n=2^p$ scramblers, descramblers, sequence generators and/or sequence detectors are provided by using an LFSR applying at least one function $GF(=^p)$ which may be characterized by p '=' functions.

In accordance with a further aspect of the present invention, one may characterize an $n=2^p$ state with p>1 2 input function by p binary functions which are one of the binary XOR (≠) or EQUALITY (=) function. One may also implement an $n=2^p$ state with p>1 2 input function by p binary devices each of which implements one of the binary XOR (≠)

or EQUALITY (=) functions. This is shown in diagram in FIG. 49. A 4-state function may be implemented by either 2 '=' functions, by two '≠' functions, by a '= ≠' combination, or by a '≠ =' combination. Each implements a different 4-state truth table. Assume that 2 4-state signals 4901 and 4902 are provided. These may be converted for instance by A/D converters 4903 and 4904 in two sets of two binary signals 4905 and 4907 and 4906 and 4908. Corresponding bits of the sets are provided to an implementation 4909 and 4910 of either the binary function '≠' or '='. Implementation 4909 provides a binary signal 4911 and 4910 provides 4912. These two binary signals may be combined in D/A converter 4913 into a 4-state signal 4914. One may or one may not apply 4-state symbols or a signal that implements a 4-state symbol. It may be beneficial to continue applying binary signals or symbols, for instance until a moment that a modulated signal needs to be generated.

By mixing '≠' and '=' functions one may implement one of the following two 4-state truth tables.

| GF(=≠) | 0 | 1 | 2 | 3 |
|---|---|---|---|---|
| 0 | 1 | 0 | 3 | 2 |
| 1 | 0 | 1 | 2 | 3 |
| 2 | 3 | 2 | 1 | 0 |
| 3 | 2 | 3 | 0 | 1 |

| GF(≠=) | 0 | 1 | 2 | 3 |
|---|---|---|---|---|
| 0 | 2 | 3 | 0 | 1 |
| 1 | 3 | 2 | 1 | 0 |
| 2 | 0 | 1 | 2 | 3 |
| 3 | 1 | 0 | 3 | 2 |

One is again reminded that assignment of the $n^p$ states to a word of p bits may depend on the definition of a field GF(n). For instance in GF(8) consecutive 7 states may be defined or represented as consecutive 7 states by a binary LFSR representing a primitive polynomial. State 0 may be defined as an all 0 word. If one would like to transform states of an n-state signal, for instance from a QAM signal into a binary representation over GF(n) one should use an A/D converter that reflects the correct representation. An A/D converter thus may use a true A/D converter followed by a binary transformation table that transforms one word into another word of bits conforming with GF(n). The following 8-state examples may clarify the issue. As was shown above the states in GF(8) were represented by a specific set of 3 bits words. One may also represent one of 8-state signals in for instance a straight decimal representation. Both are provided in the following table.

| state | GF(8) | | | Decimal | | |
|---|---|---|---|---|---|---|
| 0 | 0 | 0 | 0 | 0 | 0 | 0 |
| 1 | 1 | 0 | 0 | 0 | 0 | 1 |
| 2 | 0 | 1 | 0 | 0 | 1 | 0 |
| 3 | 0 | 0 | 1 | 0 | 1 | 1 |
| 4 | 1 | 1 | 0 | 1 | 0 | 0 |
| 5 | 0 | 1 | 1 | 1 | 0 | 1 |
| 6 | 1 | 1 | 1 | 1 | 1 | 0 |
| 7 | 1 | 0 | 1 | 1 | 1 | 1 |

It is clear that most of the states in both groups are represented different. An addition may be defined as applying the XOR function on the individual bits. The following table shows as an illustration for n=8 how the result of an addition depends on the binary representation of the states.

| 1 in GF(8) | 1 0 0 | 1 0 0 | 1 0 0 | 1 0 0 | 1 0 0 | 1 0 0 | 1 0 0 | 1 0 0 |
|---|---|---|---|---|---|---|---|---|
| GF(8) | 0 0 0 | 1 0 0 | 0 1 0 | 0 0 1 | 1 1 0 | 0 1 1 | 1 1 1 | 1 0 1 |
| + with ≠ | 1 0 0 | 0 0 0 | 1 1 0 | 1 0 1 | 0 1 0 | 1 1 1 | 0 1 1 | 0 0 1 |
| 1 in dec | 0 0 1 | 0 0 1 | 0 0 1 | 0 0 1 | 0 0 1 | 0 0 1 | 0 0 1 | 0 0 1 |
| decimal | 0 0 0 | 0 0 1 | 0 1 0 | 0 1 1 | 1 0 0 | 1 0 1 | 1 1 0 | 1 1 1 |
| + with ≠ | 0 0 1 | 0 0 0 | 0 1 1 | 0 1 0 | 1 0 1 | 1 0 0 | 1 1 1 | 1 1 0 |

Multiplication over GF(n) may therefore also be a transformation that requires the multiplication over GF(n) in binary form as provided above. It should then also be clear that one may create different addition tables and multiplication tables, based on the initial assignments of states. In accordance with a further aspect of the present invention, one may create a modified adder over GF($n=2^p$) by using the same representation of n-state symbols in GF(n) in binary form, but one may modify the actual execution of the addition over GF(n) in binary form by replacing one or more XOR functions by an EQUIVALENT function. One may also use other representations of n states in binary form that do not comply with GF(n), such as the straight decimal to binary representations. This may not affect the scrambling or descrambling methods. However, it may create different types of sequence generators of which the performance may or may not provide maximum length n-state sequences. One may thus create processing functions which apply only XOR functions, only EQUIVALENT functions, or a mixture of XOR and EQUIVALENT functions. These functions may represent in binary form an adder over GF(n), or a modified adder over GF(n) or neither an adder nor a modified adder over GF(n).

Figure 21:
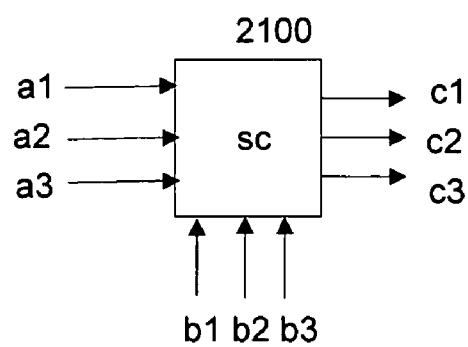

The basic implementation of a function with only ≠ or XOR functions is the one shown for instance in FIG. 20 and FIG. 21. Other functions may be defined by using inverters or multipliers. The use of inverters may start defining the assignment of the n states. The following table shows the binary implementation of the multiplier 2 over GF(8) as used before in a sequence generator according to FIG. 25. In GF(8) the multiplier 2 may be represented as [0 2 6 5 7 1 4 3]. Which state is assigned to a combination of 3 bits depends on the GF(8) field. The multiplier 2 over GF(8) in binary form is provided in the following table.

| state | GF(8) | | | ×2 | | |
|---|---|---|---|---|---|---|
| 0 | 0 | 0 | 0 | 0 | 0 | 0 |
| 1 | 1 | 0 | 0 | 0 | 1 | 0 |
| 2 | 0 | 1 | 0 | 1 | 1 | 1 |
| 3 | 0 | 0 | 1 | 1 | 1 | 1 |
| 4 | 1 | 1 | 0 | 1 | 0 | 1 |
| 5 | 0 | 1 | 1 | 1 | 0 | 0 |
| 6 | 1 | 1 | 1 | 1 | 1 | 0 |
| 7 | 1 | 0 | 1 | 0 | 0 | 1 |

Figure 50:
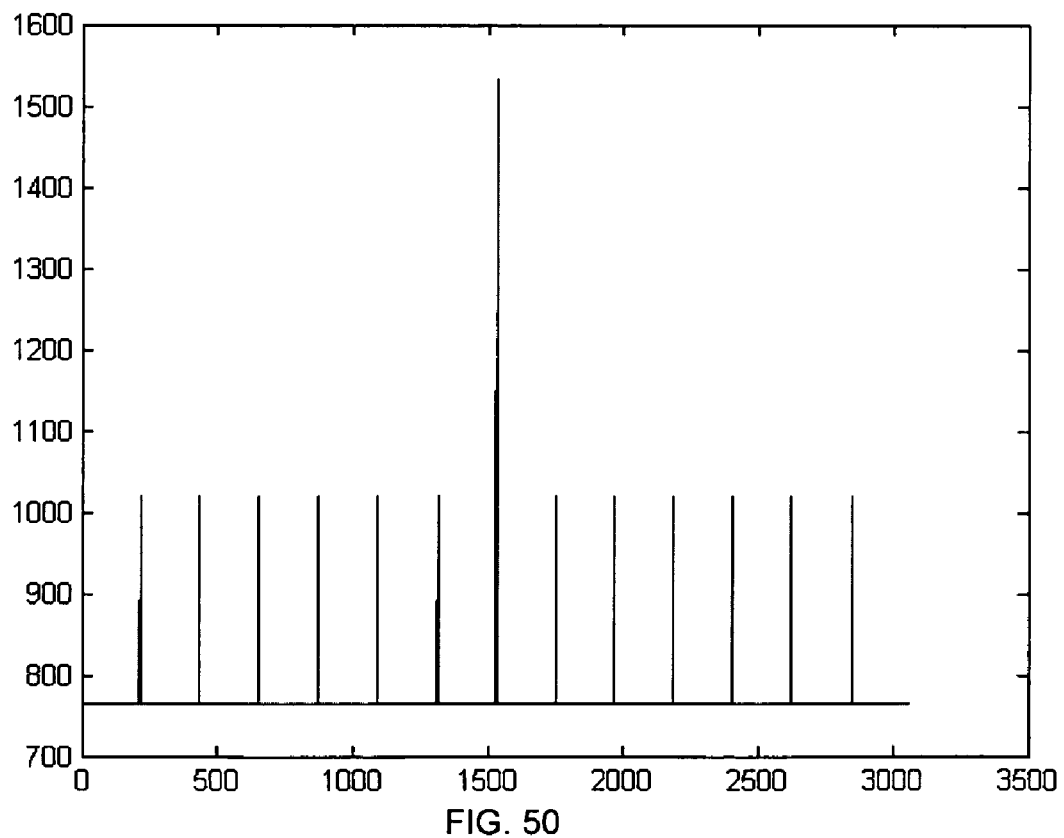
FIG. 50 shows an auto-correlation graph in accordance with a further aspect of the present invention.

The inventor has simulated the sequence generator of FIG. 25 with the implementation of the function as shown in FIGS. 20 and 21 and with the multiplier 2 over GF(8) in binary form, generating a sequence of 511 symbols each represented by 3 bits, which is a sequence of 1533 bits. The auto-correlation was determined using the n-state modified binary correlation method and generating a graph as shown in FIG. 28. This graph was obtained by comparing the sequence with a shifted version of itself. The comparison was made between words of 3 bits. If corresponding 3 bits were not all identical nothing was added to a sum. If all corresponding bits were equal in two corresponding words a 1 was added to a sum. Other correlation schemes are possible and contemplated. One may also determine the auto-correlation on the basis of individual bits using the same correlation scheme as for FIG. 28. The correlation graph of the binary sequence is provided in FIG. 50.

It should be clear that for functions with higher values for p in $n=2^p$ one has to provide an additional reversible binary function or implementation of such function. For instance two 8-state symbols of 3 bits marked as [a1 a2 a3] and [b1 b2 b3] are provided. Each set of corresponding symbols is processed by a device implementing a logic or switching function sc1, sc2 or sc3. The results are thus: c1→(a1 sc1 b1); c2→(a2 sc2 b2); and c3→(a3 sc3 b3) resulting in an 8-state symbol [c1 c2 c3] represented in binary form. One can easily see how this may be expanded to higher values of $n=2^p$. In accordance with a further aspect of the present invention all these functions may be applied in an n-state LFSR implemented in binary form.

It should be clear that one may implement an n-state with $n=2^p$ and p>1 logic or switching function in binary form with p implementations of binary logic functions which may be all XOR functions or all EQUIVALENT functions or a combination of both functions. The XOR and the EQUIVALENT function are both the only binary reversible functions. In accordance with an aspect of the present invention one may implement an n-state with $n=2^p$ and p>1 logic or switching function in binary form with p implementations of reversible binary functions.

There is another benefit in using n-state LFSRs in generating maximum length sequences. In general, one will use an LFSR to generate a maximum length sequence of $n^k-1$ n-state symbols. For instance, in order to generate a sequence of 255 bits with pseudo random properties, one will need an LFSR of length 8. A novel way to generate binary sequences with decent pseudo-random properties is to apply a short LFSR, for instance having 2 elements, which may generate a pseudo random sequence of length $n^2-1$ n-state symbols. For instance, a 4-state LFSR may generate a pseudo random sequence of 15 4-state symbols. However, when one represents a 4-state symbol by 2 bits the 15 4-state symbol sequence can be represented as a 30 bits sequence. An 8-state LFSR with 2 shift register element can produce an m-sequence of 63 8-state symbols. This is equivalent to 63*3=189 bits. Both cases have been tested with the herein provided generators and will produce maximum length n-state sequences with an optimal auto-correlation when determined by the n-state modified binary correlation method. A 16-state generator of two elements will generate 255 16-state sequences, having 255*4=1010 bits.

Figure 49:
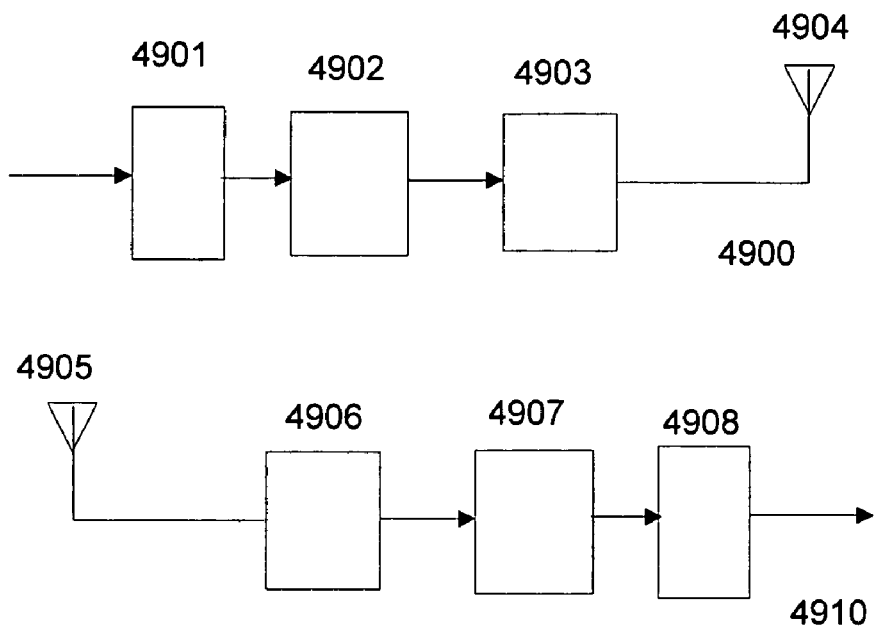
FIG. 49 illustrates a communication system in accordance with an aspect of the present invention.

In accordance with an aspect of the present invention, scramblers as provided herein may be used to scramble an n-state signal, for instance an n-state signal that will be transmitted as a QAM-n or QAM-$2^p$ signal wherein $2^p$ may be a multiple of n. The modulated QAM signal, which may be a QAM-256 signal or any other n-state signal may be part of a communication system, such as a wireless communication system or a video transmission system. A sequence generated according to methods herein provided may also be applied in a communication system. In accordance with a further aspect of the present invention, a communication system is provided that applies a scrambler, and/or a descrambler, and/or a sequence generator which are herein provided in accordance with one or more aspects of the present invention. FIG. 49 shows, in diagram, an example of a transmitter 4900 and a receiver 4910, in accordance with an aspect of the present invention. For instance a signal is n-state scrambled in a binary fashion in n-state LFSR scrambler 4901. The scrambled signal may be error correcting coded in a coder 4902 and then provider to a modulator 4903. A signal for transmission may be provided to an antenna 4904. A diagram of a receiver is also provided in 4910 of FIG. 49. An antenna 4905 receives a modulated signal and provides a received signal to a demodulator 4906. The demodulated signal may be error corrected and decoded in 4907 and then provided to a descrambler 4908.

One may also store QAM signals on an optical disk. By replacing the antennas in FIG. 49 by a signal writer such as a light source and a light pick-up as replacing the receiving antenna one may write a signal to an optical disk and read the n-state optical signal from the disk. Accordingly, a storage system is provided that can apply the scrambling and descrambling methods provided herein.

In view of the above description of the present invention, it will be appreciated by those skilled in the art that many variations, modifications and changes can be made to the present invention without departing from the spirit or scope of the present invention as defined by the claims appended hereto. All such variations, modifications or changes are fully contemplated by the present invention.

While the invention has been described with reference to an illustrative embodiment, this description is not intended to be construed in a limiting sense. For example, while the disclosed embodiments utilize discrete devices, these devices can be implemented using one or more appropriately programmed processors, special-purpose integrated circuits, digital processors, or an analog or hybrid counterpart of any of these devices.

The invention claimed is:

1. A method for processing a sequence of n-state symbols in binary form with a Linear Feedback Shift Register (LFSR), the LFSR including a plurality of outputs to provide an n-state symbol in binary form, each output enabled to provide a signal representing a bit, comprising:
performing the processing belonging to the group consisting of scrambling, descrambling and sequence generation; and
as part of performing the processing belonging to the group consisting of scrambling, descrambling and sequence generation, applying the LFSR for processing the sequence of n-state symbols in binary form, each n-state symbol of the sequence able to assume one of n states with $n=2^p$ and p equal to or greater than 2 and an n-state symbol being represented by at least p bits, the LFSR implements in binary form an n-state logic function defined by an n-state truth table which determines an n-state output state of the n-state logic function as a result of a first and a second input of the n-state logic function each enabled to assume each one of n states and wherein the n-state logic function is implemented with at least one reversible binary logic function which is an EQUALITY (=) function, and
wherein application of the EQUALITY function by the LFSR in performing the processing belonging to the group consisting of scrambling, descrambling and sequence generation affects an output sequence of n-state symbols that is output by the LFSR.

2. The method of claim 1, wherein p>2.

3. The method as claimed in claim 1, the LFSR further comprising at least one device implementing in binary form a multiplication with a constant over $GF(n=2^p)$.

4. The method as claimed in claim 1, the LFSR further comprising at least one device implementing in binary form a zero-based n-state reversible inverter in binary form.

5. The method as claimed in claim 1, the LFSR further comprising at least one device implementing in binary form a non-zero-based n-state reversible inverter in binary form.

6. The method as claimed in claim 1, wherein the LFSR is an LFSR in Fibonacci configuration.

7. The method as claimed in claim 1, wherein the LFSR is an LFSR in Galois configuration.

8. The method as claimed in claim 1, further comprising:
applying the LFSR for scrambling the sequence of n-state symbols in binary form, including the steps:
applying a second n-state logic function implemented by a plurality of binary reversible logic functions having a first and second plurality of inputs and a plurality of outputs
receiving from a source external to the LFSR a first plurality of bits representing a first n-state symbol on the first plurality of inputs of the second n-state logic function;
receiving on the second plurality of inputs of the second n-state logic function a second plurality of bits from the LFSR;
outputting on the plurality of outputs of the second n-state logic function an n-state output symbol represented by a plurality of bits;
inputting a third plurality of bits representing a third n-state symbol based on the n-state output symbol into the LFSR; and
providing on a plurality of outputs of the LFSR a sequence of scrambled n-state symbols each represented by at least p bits.

9. The method as claimed in claim 8, further comprising connecting the plurality of outputs of the second n-state logic function to a plurality of inputs of the LFSR via an n-state reversible inverter in binary form.

10. The method as claimed in claim 8, further comprising transforming the n-state symbol represented by at least p bits into a single n-state signal able to assume one of at least n states.

11. The method as claimed in claim 1, wherein the LFSR is applied for generating a maximum length sequence of n-state symbols represented in binary form.

12. The method as claimed in claim 11, wherein a correlation of the sequence with another sequence is determined by applying an n-state modified binary correlation method.

13. The method of claim 1, wherein the n-state truth table represents a two input/single output n-state function, the truth table including n different output states.

14. The method of claim 1, wherein the n-state function is not an addition over GF(n).

15. A system for scrambling and descrambling a sequence of k with k>2 n-state symbols each n-state symbol able to assume one of n states with n>2 and $n=2^p$ and each symbol being represented by at least p binary signals, comprising:
a scrambler Linear Feedback Shift Register (LFSR), the LFSR enabled to process a word of at least p bits as a single n-state symbol,
wherein the scrambler scrambles a first sequence of words of at least p bits per word into a second sequence of words of at least p bits per word, and
wherein the LFSR implements in binary form an n-state logic function defined by an n-state truth table which determines an n-state output state of the n-state logic function as a result of a first and a second input of the n-state logic function each input and output enabled to assume each one of n states and wherein the n-state logic function is implemented with at least one reversible binary logic function which is an EQUALITY (=) function; and
a corresponding descrambler with a shift register in a forward connected configuration wherein the corresponding descrambler descrambles the second sequence of words into the first sequence of words.

16. The system as claimed in claim 15, the first LFSR comprising a shift register with a plurality of register elements, each element enabled to store at least p bits.

17. The system as claimed in claim 15, the first LFSR further comprising an n-state inverter in binary form.

18. The system as claimed in claim 15, wherein the system is applied in a communication system using $QAM-2^s$ modulation with s equal to or greater than 2.

19. An n-state Linear Feedback Shift Register (n-state LFSR) to provide a sequence of n-state symbols in binary form, an n-state symbol enabled to assume one of n states with n>2 and $n=2^p$ with p>1, comprising:
at least p binary Linear Feedback Shift Registers (binary LFSRs), each binary LFSR including a binary output to provide a binary signal, the binary outputs of the at least p binary LFSRs enabled to provide a binary word representing an n-state symbol in the sequence; and
an implementation in binary form of an n-state logic function defined by a state of a first input enabled to assume any of n states, a state of a second input enabled to assume any of n states and a state of an n-state output enabled to assume any of n states, wherein an n-state truth table determines the state of the n state output as a result of the state of the first input and the state of the second input, wherein
the n-state truth table is determined only by binary reversible logic functions of which at least one is an EQUALITY (=) function, and
wherein the n-state LFSR applies the n-state logic function to provide the sequence of n-state symbols in binary form and the n-state LFSR is part of an implementation of a scrambler, a descrambler and a sequence generator.

* * * * *